(12) United States Patent
Miyoshi

(10) Patent No.: US 6,612,599 B2
(45) Date of Patent: Sep. 2, 2003

(54) BICYCLE SUSPENSION

(75) Inventor: Hiroyuki Miyoshi, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/373,875

(22) Filed: Feb. 27, 2003

(65) Prior Publication Data

US 2003/0132601 A1 Jul. 17, 2003

Related U.S. Application Data

(62) Division of application No. 09/758,541, filed on Jan. 12, 2001, now Pat. No. 6,543,799.
(60) Provisional application No. 60/175,964, filed on Jan. 13, 2000.

(51) Int. Cl.$^7$ .............................................. B60G 17/015
(52) U.S. Cl. ....................... 280/283; 188/282.4; 701/57
(58) Field of Search ................................ 280/283–286; 188/282.2–282.4, 266.2–266.5, 284, 299.1

(56) References Cited

U.S. PATENT DOCUMENTS

| | | | |
|---|---|---|---|
| 5,370,200 A | 12/1994 | Takata | 180/206 |
| 5,445,401 A | 8/1995 | Bradbury | 280/276 |
| 5,509,677 A | 4/1996 | Bradbury | 280/276 |
| 5,586,780 A | 12/1996 | Klein et al. | 280/275 |
| 5,597,169 A | 1/1997 | Bradbury | 280/276 |
| 5,681,234 A | 10/1997 | Ethington | 474/70 |
| 5,728,017 A | 3/1998 | Bellio et al. | 474/70 |
| 5,836,414 A | 11/1998 | Seto et al. | 180/207 |
| 5,865,454 A | 2/1999 | Campagnolo | 280/238 |
| 5,921,572 A | 7/1999 | Bard et al. | 280/284 |
| 5,922,035 A | 7/1999 | Chen | 701/22 |
| 5,924,714 A | 7/1999 | Farris et al. | 280/276 |
| 5,971,116 A | 10/1999 | Franklin | 188/282.4 |
| 6,012,353 A | 1/2000 | Kawakami | 74/502.2 |
| 6,047,230 A | 4/2000 | Spencer et al. | 701/57 |
| 6,050,583 A | 4/2000 | Bohn | 280/283 |
| 6,073,736 A | 6/2000 | Franklin | 188/322.15 |
| 6,095,541 A | 8/2000 | Turner et al. | 280/276 |
| 6,104,975 A | 8/2000 | Matsuo | 701/93 |
| 6,149,174 A | 11/2000 | Bohn | 280/283 |
| 6,192,300 B1 | 2/2001 | Watarai et al. | 701/1 |
| 6,263,992 B1 | 7/2001 | Li | 180/206 |
| 6,543,799 B2 * | 4/2003 | Miyoshi | 280/283 |

FOREIGN PATENT DOCUMENTS

EP 1 006 045 6/2000

\* cited by examiner

*Primary Examiner*—Lesley D. Morris
*Assistant Examiner*—L. Lum
(74) *Attorney, Agent, or Firm*—Shinjyu Global IP Counselors, LLP

(57) ABSTRACT

A computer controlled suspension system is provided for a bicycle, which can effectively absorb shock and provide stability on rough surfaces regardless of the speed of the vehicle. The suspension system has a control unit, a front suspension, a rear suspension, a front wheel terrain sensor, and a rear controller. The rear suspension is selectively adjustable by the control unit to change stiffness of the rear suspension. When the front suspension hits a bump or a depression in the surface of the ground, a signal is sent to the rear controller so that the rear suspension can react appropriately. In one embodiment, a pedaling torque sensor is operatively coupled to the control unit to input a signal that is indicative of pedaling force, and the rear controller adjusts stiffness of the rear suspension in response to the pedaling force via the control unit. In another embodiment, one or more gear position sensors are operatively coupled to the control unit to input a signal that is indicative of gear position, and the rear controller adjusts stiffness of the rear suspension in response to the gear position force via the control unit. A locking mechanism is provided to operatively coupled to selectively lock the rear suspension in a compressed condition. The front and rear suspension preferably uses at least cylinder with a coil spring and a compressible material located between individual turns of the coil spring.

17 Claims, 16 Drawing Sheets

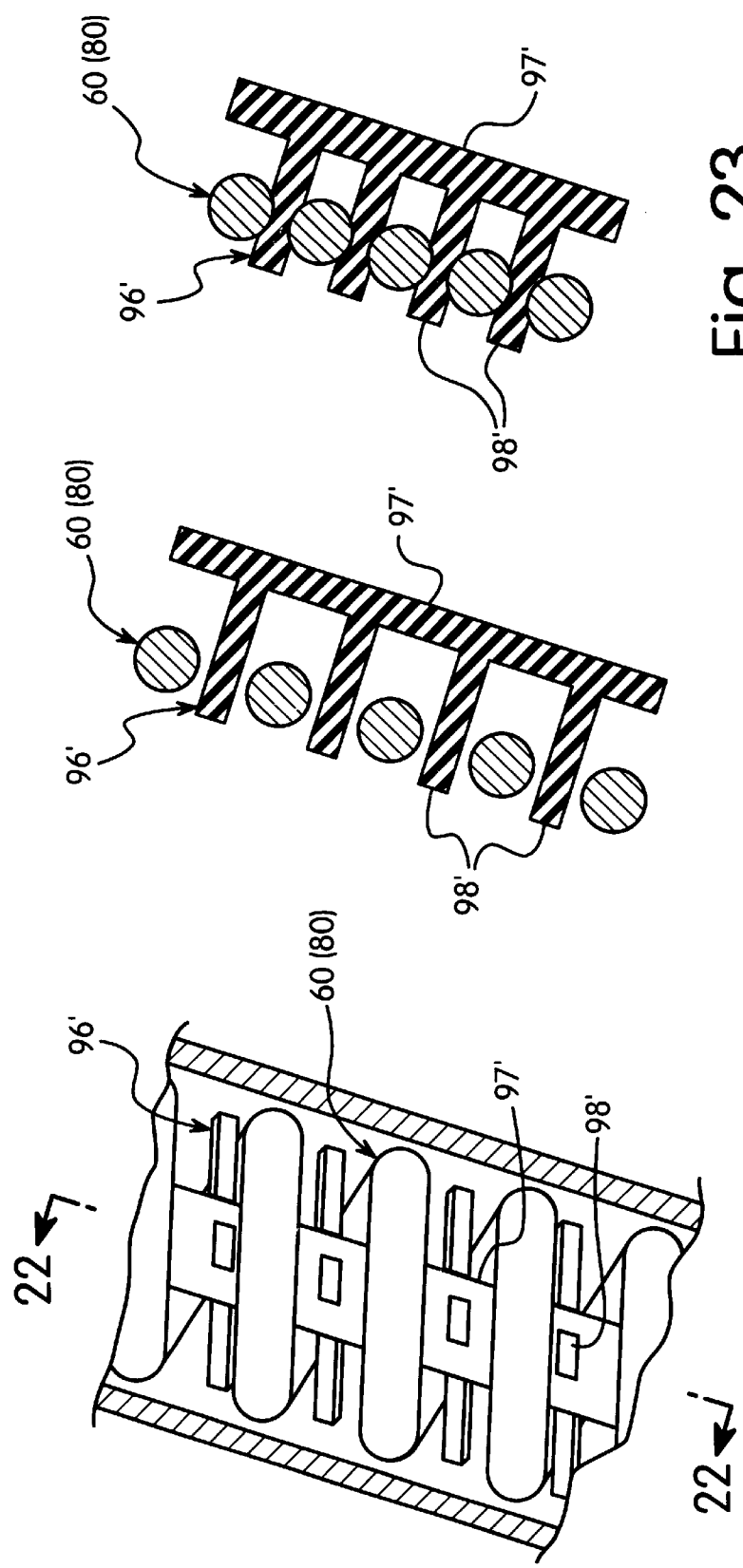

BICYCLE SUSPENSION

This application is a divisional application of U.S. patent application Ser. No. 09/758,541, now U.S. Pat. No. 6,543,799. The entire disclosure of U.S. Pat. No. 6,543,799 is hereby incorporated herein by reference. Also, U.S. Pat. No. 6,543,799 claims the benefit of U.S. Provisional Patent Application Serial No. 60/175,964, filed Jan. 13, 2000, the entire disclosure of which is also incorporated herein by reference.

BACKGROUND OF THE INVENTION

1. Field of the Invention

This invention generally relates to suspension systems. More specifically, one aspect of the present invention relates to computer controlled suspension systems for a bicycle.

2. Background Information

Various forms of suspension systems have been developed for vehicles in general and bicycles in particular. Bicycles, especially mountain bikes (MTB) and all terrain bikes (ATB), have been outfitted with front and/or rear suspension assemblies and systems to absorb the shock that would have been transmitted to the rider when riding on a rough road. These suspension assemblies range from very simple to very complex.

These suspension assemblies and systems, however, have been unable to suppress adequately the bucking action that often occurs when a rider traverses a bump or dip. This bucking effect is more pronounced at higher speeds, often resulting in the rider losing control and/or being thrown from the bicycle. The reason for this problem is that there has not been an efficient way to vary the rigidity of the suspension system while the bicycle is in motion.

Examples of some prior art bicycles utilizing rear suspension assemblies are disclosed in the following U.S. Pat. No. 5,445,401 to Bradbury; U.S. Pat. No. 5,470,090 to Stewart et al.; U.S. Pat. No. 5,509,677 to Bradbury; U.S. Pat. No. 5,586,780 to Klein et al.; U.S. Pat. No. 5,597.169 to Bradbury; U.S. Pat. No. 5,921,572 to Bard et al.; U.S. Pat. No. 5,924,714 to Farris et al.; U.S. Pat. No. 6,050,583 to Bohn; and U.S. Pat. No. 6,095,541 to Turner et al.

Vehicle suspension assemblies and systems often react to the weight of the operator by being compressed. In other words, the center of gravity is lowered when the operator mounts or enters the vehicle. Similarly, the center of gravity is raised when operator dismounts or exits the vehicle. Such variations in height can make mounting and dismounting or entering and exiting difficult.

In view of the above, there exists a need for bicycle suspension systems which overcome the above mentioned problems in the prior art. This invention addresses this need in the prior art as well as other needs, which will become apparent to those skilled in the art from this disclosure.

SUMMARY OF THE INVENTION

One object of the present invention is to provide a computer controlled suspension system for a vehicle, preferably a bicycle, which can effectively absorb shock and provide stability on rough surfaces regardless of the speed of the vehicle.

Another object of the present invention is to provide a computer controlled suspension system for a vehicle, preferably a bicycle that can effectively absorb shock and provide stability on rough inclined surfaces.

Another object of the present invention is to provide an active controlled suspension for a vehicle, preferably a bicycle, which can adapt to various road conditions, e.g., smooth, rough, incline, declines, etc., without compromising handling or efficiency.

Still another object of the present invention is to provide a suspension system for a vehicle, preferably a bicycle, which has a variable damper to allow the vehicle to adapt better to different terrains and slopes.

Another object of the present invention is to provide a dampening mechanism for a vehicle, preferably a bicycle, that includes a coil spring and elastomer that will produce a higher spring constant.

Yet another object of the present invention is to provide a suspension system that allows the vehicle, preferably a bicycle, to maintain a fixed height regardless of the weight or force borne by the vehicle at rest.

In accordance with certain aspects of the present invention, a bicycle suspension system is provided that comprises a control unit, a front suspension, a rear suspension, a front wheel terrain sensor, and a rear controller. The control unit is coupled to the bicycle frame. The front suspension is configured to be coupled between the bicycle frame and the front wheel such that the front wheel is movable relative to the bicycle frame in response to a shock applied to the front wheel. The rear suspension is configured to be coupled between the bicycle frame and the rear wheel such that the rear wheel is movable relative to the frame in response to a shock applied the rear wheel. The rear suspension is selectively adjustable by the control unit to change stiffness of the rear suspension. The front wheel terrain sensor is operatively coupled to the control unit to input a first signal that is indicative of an amount of compression or expansion of the front suspension. The rear controller is operatively connected to the rear suspension and the control unit so that the control unit adjusts stiffness of the rear suspension in response to the amount of compression or expansion of the front suspension.

In accordance with certain aspects of the present invention, a bicycle is equipped with a front suspension and rear suspension. The vehicle has at least one front and at least one rear tire. The dampening factor, i.e. the rigidity, of the rear suspension is controlled by the front suspension. When encountering a protrusion or depression the front suspension is compressed or expanded accordingly. The amount of compression or expansion can then be related to the rear suspension via a computer or through a manual apparatus. The computer or manual apparatus adjusts the rigidity of the rear suspension upward or downward as needed. The adjustment happens at a time determined by the speed of the vehicle, weight distribution, the size of the protrusion or depression, the force at which the vehicle impacted the protrusion or depression, and the distance between the front and rear suspensions and tires. If, however, no protrusions or depressions are encountered the front and rear suspensions remain essentially fixed, providing superior handling for the operator.

The dampening factor is preferably adjusted by a computer or manually according to the riding conditions. For example, if an operator is pedaling a bicycle uphill, the slope, weight distribution, and crank torque contribute to placing more pressure on the rear tire. Similarly, if an operator is pedaling downhill, the above mentioned factors contribute to placing more pressure on the front tire. If the suspension is soft then a loss of control can result. The suspension system of the present invention would automatically stiffen when the grade of the hill exceeds 5%. Furthermore, when braking suddenly, force and weight distributions sometimes tend to shift forward due to momentum. The dampening mechanism of the present invention would adjust for sudden braking by stiffening suspension system, thus giving the operator greater control. Similarly, when the operator is accelerating, the weight distribution tends to shift rearward. A soft suspension would not be ideal in these situations because the rear wheel would tend to drop, making the efforts of the operator less efficient. The dampening mechanism of the present invention would compensate for this by stiffening the suspension system when the chain tension exceeds 50 kgs. While riding at slow speeds a soft suspension system is not preferred. The suspension system of the present invention would stiffen at speeds under 8 km/h.

Some of the above mentioned aspects of the present invention can be attained by a bicycle suspension system that comprises a control unit, a suspension, a bicycle driving sensor and a controller. The suspension is configured to be coupled between first and second parts of a bicycle that are movable relative to each other in response to a shock applied to the bicycle. The suspension is selectively adjustable by the control unit to change stiffness of the suspension. The bicycle driving sensor operatively coupled to the control unit to input a first signal that is indicative of bicycle driving force. The controller is operatively connected to the suspension and the control unit so that the control unit adjusts stiffness of the suspension in response to the bicycle driving force.

Some of the above mentioned aspects of the present invention can be attained by a bicycle suspension system that comprises a control unit, a suspension, a bicycle driving sensor, a controller and a velocity sensor. The suspension is configured to be coupled between first and second parts of a bicycle that are movable relative to each other in response to a shock applied to the bicycle. The suspension is selectively adjustable by the control unit to change stiffness of the suspension. The bicycle driving sensor operatively coupled to the control unit to input a first signal that is indicative of bicycle driving force. The controller is operatively connected to the suspension and the control unit so that the control unit adjusts stiffness of the suspension in response to the bicycle driving force. The velocity sensor is operatively coupled to the control unit to input a second signal that is indicative of forward velocity.

Bicycles with multiple sprockets for changing gears can perform better with suspension systems that have variable firmness. A typical multi-sprocket bicycle has two front sprockets one larger than the other and several rear sprockets of varying diameters. To maximize pedaling efficiency, the suspension system of the present invention would stiffen when the smaller front sprocket is used. The suspension system of the present invention would also stiffen when the larger front sprocket is used and either of the two largest rear sprockets are also used.

This aspect of the present invention can be attained by a bicycle suspension system that comprises a control unit, a suspension, a first gear position sensor and a controller. The suspension is configured to be coupled between first and second parts of a bicycle that are movable relative to each other in response to a shock applied to the bicycle. The suspension is selectively adjustable by the control unit to change stiffness of the suspension. The first gear position sensor is operatively coupled to the control unit to input a first signal that is indicative of gear position. The controller is operatively connected to the suspension and the control unit so that the control unit adjusts stiffness of the rear suspension in response to the gear position.

In accordance with certain aspects of the present invention, a bicycle, is equipped with a front suspension and a rear suspension. The vehicle has at least one front and one rear tire. The dampening factor, i.e. the rigidity, of the rear suspension is controlled by the front suspension. When encountering a protrusion or depression on an incline or decline the front suspension is compressed or expanded accordingly. The amount of compression or expansion can then be related to the rear suspension via a computer. The computer adjusts the rigidity of the rear suspension upward or downward as needed. The adjustment happens at a time determined by the speed of the vehicle, the size of the protrusion or depression, the force at which the vehicle impacted the protrusion or depression, and the distance between the front and rear suspensions and tires. The adjustment of the rear suspension also depends upon weight distribution of the operator, slope of the incline or decline, crank torque, and gear combination.

In accordance with certain aspects of the present invention, a dampening mechanism includes a coil spring assembly. The coil spring assembly has a coil spring and an elastomer to produce a higher spring constant. The elastomer can be placed directly on the coil spring as a coating creating an elastomer coated coil spring. Depending on the cross-sectional shape of the elastomer coated coil spring, the wire diameter or thickness of the coil spring assembly would increase. The gap between the coils would decrease, accordingly. Therefore, the elastomer coated coil spring cannot be compressed as much as the same coil spring were it not coated. Thus, the elastomer coated coil spring has an increased spring constant.

In accordance with certain aspects of the present invention, a dampening mechanism includes a coil spring and an elastomer to produce a higher spring constant. The elastomer is placed between the gaps of the coils of the coil spring in any number of ways. The elastomer can be fashioned like a coil spring so that when compressed there would be no or very little space from the center to the outer periphery. The elastomer can be fashioned like a ladder with rings acting as the ladder rungs and sidepieces. Alternatively, the elastomer can be fashioned like a ladder with rings and only one sidepiece. The elastomer can be assembled with the coil spring so that the elastomer rings or coils fit between the coils of the coil spring. With the elastomer rings or coils fixed between the coil gaps of the coil spring, the coil spring cannot be compressed as much were the elastomer not present. Thus, the coil spring with an elastomer fixed between the coils of the coil spring has an increased spring constant.

In accordance with certain aspects of the present invention, a bicycle is provided suspension unit that comprises a cylinder, a piston and a dampening mechanism. The cylinder has a first mounting portion and a chamber with an opening and an abutment. The piston having a first end portion movably coupled in the chamber of the cylinder and a second mounting portion. The dampening mechanism is positioned within the chamber between the abutment and the piston, the dampening mechanism including a coil spring and a compressible material located between individual turns of the coil spring.

In accordance with certain aspects of the present invention, a bicycle has a suspension system that allows the vehicle to maintain a fixed height regardless of the weight or force borne by the vehicle at rest. By way of a computer or manually controlled fluid or mechanical lock, the vehicle maintains a fixed height. Usually when an operator mounts a bicycle with a conventional suspension system, the height of the bicycle decreases due to the compression of the suspension system caused by the weight of the operator. Often the operator must dismount or straddle the bicycle, e.g., at a stoplight, the conventional suspension system decompresses increasing the height of the bicycle. This can make mounting and dismounting difficult. The suspension system of the present invention has a damper mechanism that allows the height of the vehicle, preferably a bicycle, to remain fixed when mounting or dismounting. When an operator mounts the bike, the damper mechanism of the suspension system compensates for his or her weight. When the operator dismounts the fluid or mechanical lock, either manually or by a computer, locks the damper mechanism in place so that it will not decompress and elevate the height of the vehicle. The constant height allows for easier and more efficient mounting and dismounting.

In accordance with certain aspects of the present invention, a bicycle is provided suspension system that comprises a control unit, a rear suspension and a locking mechanism. The rear suspension has a cylinder with a first mounting portion and a chamber with an opening and an abutment, and a piston with a first end portion movably coupled in the chamber of the cylinder and a second mounting portion. The locking mechanism is operatively coupled to the rear suspension to selectively lock the piston and the cylinder in a compressed condition when mounted on a bicycle, the locking mechanism being moved between an unlocked position and a locked position by the control unit.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 21 is a partial cross-sectional view of the inner tubular member and coil spring with an alternate embodiment of a compressible member or material located between the turns of the coils spring for use with the front and rear suspension assemblies illustrated in FIGS. 1 and 2;

FIG. 22 is a partial cross-sectional view of the coil spring and compressible member illustrated in FIG. 21 as viewed along section line 22—22 of FIG. 21;

FIG. 23 is a partial cross-sectional view of the coil spring and compressible member illustrated in FIGS. 21 and 22 as viewed along section line 22—22 of FIG. 21 after being compressed;

DETAILED DESCRIPTION OF THE PREFERRED EMBODIMENTS

Figure 1:
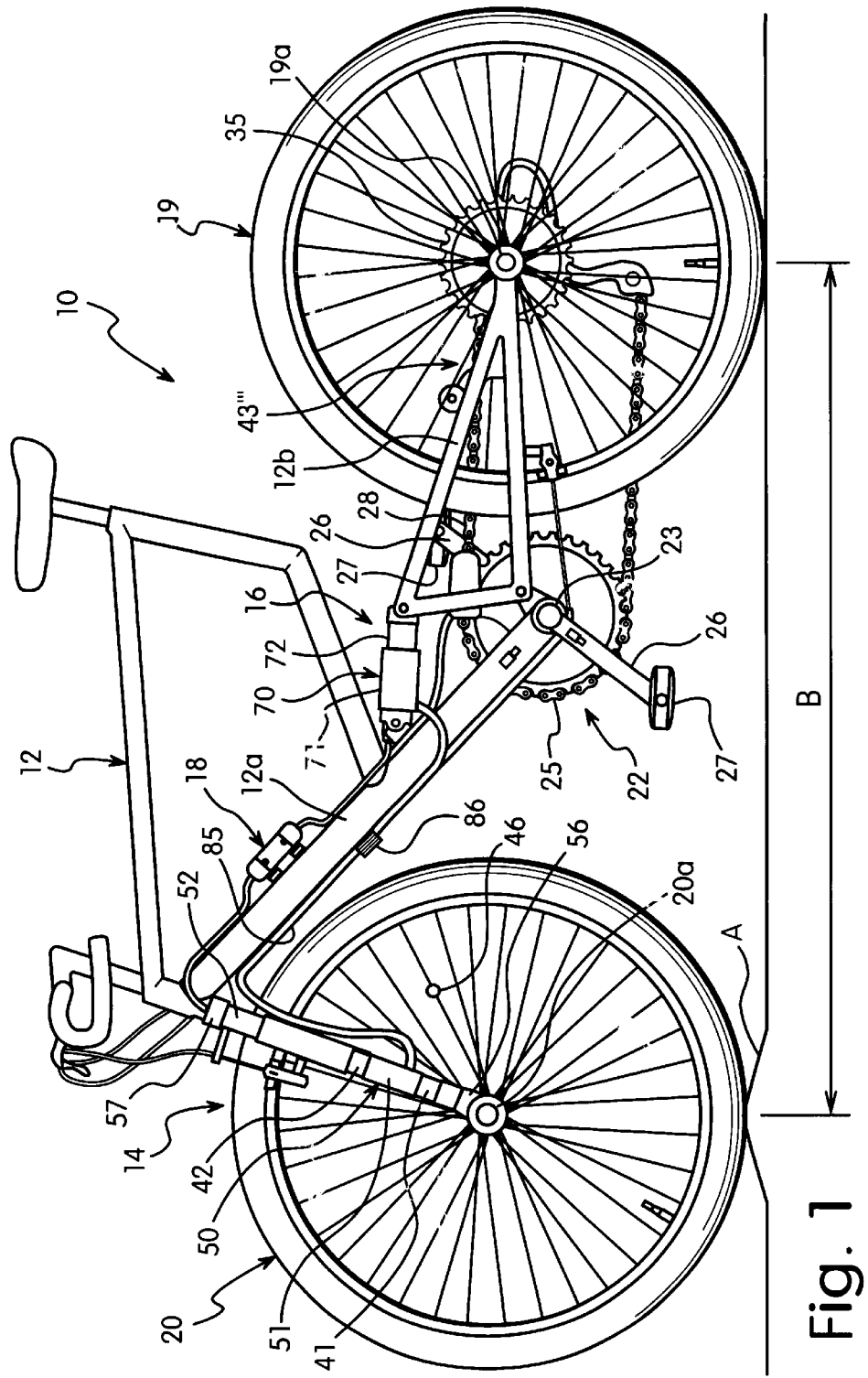
FIG. 1 is an elevational view of a bicycle having front and rear suspension assemblies in accordance with one embodiment of the present invention with the front suspension assembly compressed.
Figure 2:
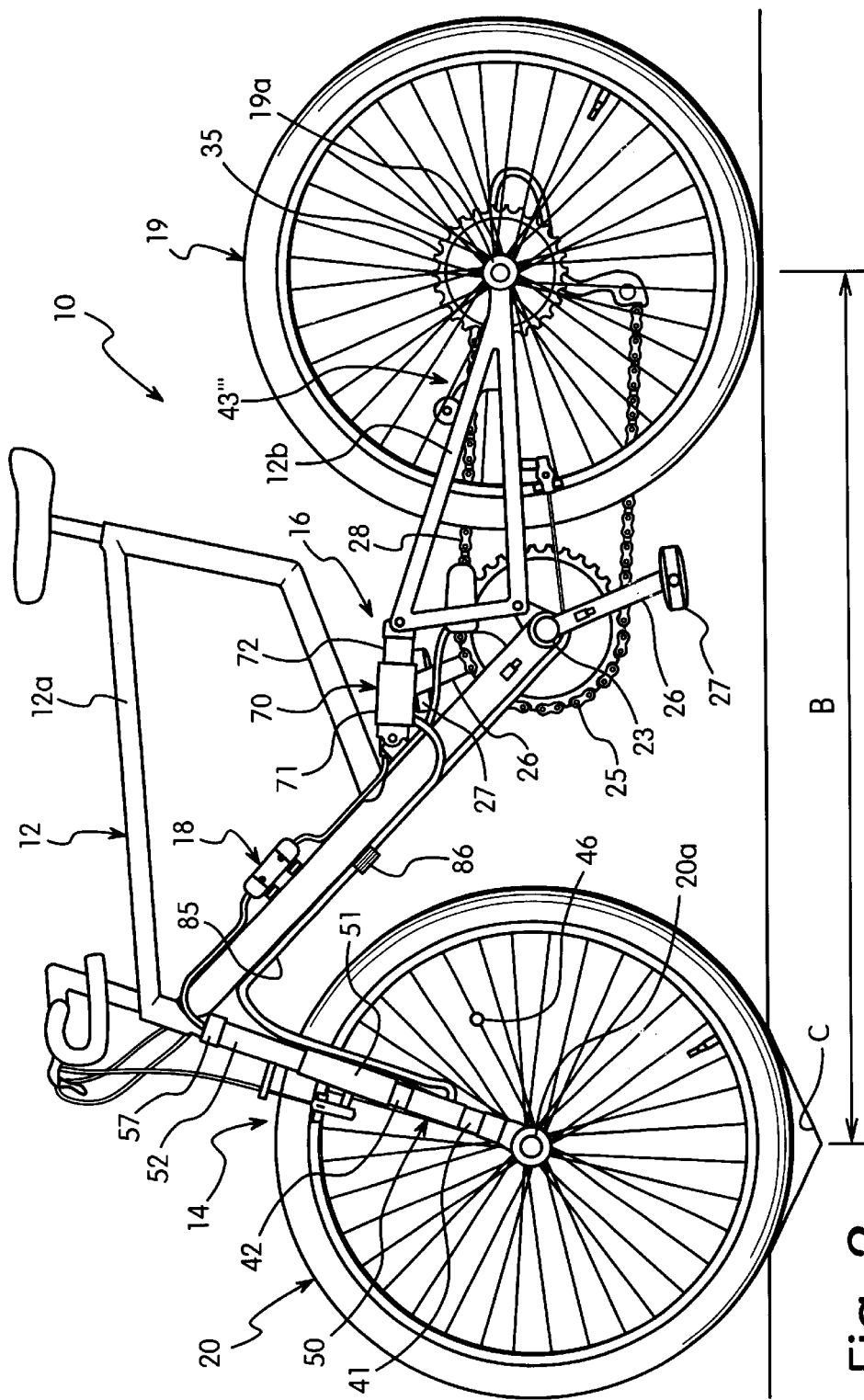
FIG. 2 is an elevational view of the bicycle with the front and rear suspension assemblies illustrated in FIG. 1 with the front suspension assembly extended.

Referring initially to FIGS. 1 and 2, a bicycle 10 is illustrated, which has a frame 12 with a front suspension assembly 14, a rear suspension assembly 16 and a computer or control unit 18 in accordance with the present invention.

The control unit 18 can be installed internally or externally of a part of the bicycle 10. The control unit 18 is preferably a small conventional computer device with a CPU that is operatively connected to the front and rear suspension assemblies 14 and 16, respectively for individually controlling their stiffnesses. When the front tire hits a bump or a depression in the surface of the ground, the front suspension assembly 14 reacts and a signal is sent to the control unit 18 to adjust rear suspension assembly 16 so that the rear suspension assembly 16 can react appropriately.

The bicycle 10 further includes a rear wheel 19 rotatably coupled about rear hub 19a, a front wheel 20 rotatably coupled about front hub 20a and a drive terrain assembly 22 for propelling bicycle 10. Drive terrain assembly 22 basically includes a bottom bracket 23, a pair of front chain rings or sprockets 24 and 25, a pair of crank arms 26 with pedals 27, a drive chain 28 and a plurality of rear sprockets 31–35 coupled to rear hub 19a of rear wheel 19 in a conventional manner. Since these parts of bicycle 10 are well known in the art, these parts will not be discussed or illustrated in detail herein, except as they are modified to be used in conjunction with the present invention. Moreover, various conventional bicycle parts such as brakes, derailleurs, additional sprocket, etc., which are not illustrated and/or discussed herein, can be used in conjunction with the present invention.

Specifically, as a rider or operator (not shown) navigates a bump A, the front suspension assembly 14 is compressed accordingly in reaction to the force exerted on the front tire from the bump as shown in FIG. 1. The degree to which the front suspension assembly 14 compresses depends on several factors or parameters. These factors include the weight and weight distribution of the operator, the speed of the bicycle 10, the height of the bump A, and the incline or decline of the road or path of which the bump is part.

Considering the above variables for the computer controlled suspension along with a current torque and gear selection of the bicycle 10, the control unit 18 selectively transmits electrical signals to the front and rear suspension assemblies 14 and 16 to control their stiffnesses. The front and rear suspension assemblies 14 and 16 will either stiffen or soften accordingly based on the signals received from the control unit 18. A battery or generator 21 is preferably used to supply electrical power to the control unit 18.

The rear suspension assembly 16 responds to the signal in accordance with the speed of the bicycle 10 and a determined distance B between the front and rear tires of the bicycle 10. The control unit 18 calculates a response time in part by the distance B between the front and rear tires of the bicycle 10 at rest and the amount of expansion and/or compression of the front suspension assembly 14. Thus, the rear suspension assembly 16 responds at the appropriate time with the appropriate resistance as controlled by the control unit 18.

Preferably, the stiffness of the rear suspension assembly 16 is made softer by the control unit 18 when the vertical acceleration exceeds approximately 0.5 G. The stiffness of the rear suspension assembly 16 is made stiffer by the control unit 18 when the horizontal acceleration exceeds approximately 1.0 G. The stiffness of the front suspension assembly 14 is also made stiffer by the control unit 18 when the horizontal acceleration exceeds approximately 1.0 G. The stiffnesses of the front and rear suspension assemblies 14 and 16 are also made stiffer by the control unit 18 when the control unit 18 calculates a forward inclination of approximately five percent from horizontal. The stiffness of the rear suspension assembly 16 is also made stiffer by the control unit 18 when the control unit 18 calculates a chain tension exceeding 50 kgs and/or a horizontal velocity under 8 km/h. If the crank revolution is 0 to 30 rpm, then the rear suspension assembly 16 is soften by the control unit 18. If the crank revolution exceeds 30 rpm, then the rear suspension assembly 16 is stiffened by the control unit 18.

The control unit 18 utilizes a plurality of sensors 41–45 to determine when to electronically adjust the front and/or rear suspension assemblies 14 and 16 in response to various factors or conditions. Preferably, the sensors 4145 for this embodiment include a front wheel terrain sensor 41, a velocity sensor 42, one or more bicycling driving sensors 43, 43', 43' or 43'" and a pair of gear position sensors 44 and 45. These sensors 41–45 are electrically coupled to the control unit 18 by electrical wires in a conventional manner for inputting various electrical signals, which are indicative of certain conditions. The signals from the sensors 41–45 are preferably electrical signals that are utilized by the control unit 18 to calculate various conditions affecting the bicycle 10. Of course, more or other types of sensors can be used as necessary depending on the type of suspension assemblies used and/or the factors/conditions desired for adjusting the stiffness of the suspension assemblies 14 and 16. The control unit 18 can be connected to additional sensors located on other parts of the bicycle to sense other riding factors.

Preferably, the control unit 18 is programmable either by the rider or by the bicycle manufacturer such that the stiffness of the front and rear suspension assemblies 14 and 16 will be adjusted based on one or more of the various parameters that have been sensed and calculated. In other words, the amount of stiffness can be modified based on one or more of the above mentioned parameters. Moreover, it is within the scope of this invention for the rider to program which variables will increase of decrease the stiffness of the suspension assemblies.

Similarly, in FIG. 2, if the operator attempts to navigate a depression C, the front suspension assembly 14 expands in reaction to the depression C. The degree to which the front suspension assembly 14 expands depends on several factors or parameters. These factors include the weight and weight distribution of the operator, the speed of the bicycle 10, the height of the bump A, and the incline or decline of the road or path of which the bump is part. The front wheel terrain sensor 41 is provided for measuring these factors or conditions. Of course, more than two sensors may be provided as necessary depending on the type of front wheel terrain sensor 41 utilized in controlling the suspension assembly and the factors/conditions desired to computer control the suspension assembly.

The front wheel terrain sensor 41 is electrically coupled to control unit 18 to input a signal that is indicative of the amount of compression and/or expansion of the front suspension assembly 14. Preferably, this front wheel terrain sensor 41 is an accelerometer that can be utilized to determine a plurality of conditions, including forward velocity, tilt, horizontal acceleration and vertical acceleration of the bicycle. Preferably, the accelerometer is a biaxial accelerometer that operates along two axes disposed substantially perpendicular to one another. One of the axes of the accelerometer is oriented substantially horizontally, i.e., parallel to the forward direction of travel of bicycle 10. The other axis of the accelerometer is oriented substantially vertically. The biaxial accelerometer measures forward velocity and tilt of the bicycle along the horizontal axis, while vertical acceleration of the bicycle 10 is measured along the vertical axis. The measurements of the accelerometer are combined to produce the input signal representative thereof. The input signal preferably includes a DC signal and an AC signal. The tilt of the bicycle 10 is preferably determined by variations in the DC signal compared to the gravitational vector. The control unit 18 performs the electrical calculation to determine the amount of tilt. The forward velocity is determined by the control unit 18 using an integration of the acceleration in the horizontal direction. The vertical acceleration is also determined by the control unit 18 which utilizes direct measurement of the AC signal aptitude in the vertical direction. The vertical acceleration of the bicycle 10 indicates the degree of compression and expansion of the front suspension assembly 16.

Preferably, a separate velocity sensor 42 is utilized to determine the forward velocity. Of course, the forward velocity can be obtained from the measurements of the front wheel terrain sensor 41 if an accelerometer is used. This velocity sensor 42 utilizes a magnet 46 attached to a spoke of the front wheel 20 as seen in FIG. 1. The velocity sensor 42 is a device that senses the magnet 46 for determining the evolutions per minute of the wheel 20.

Figure 7:
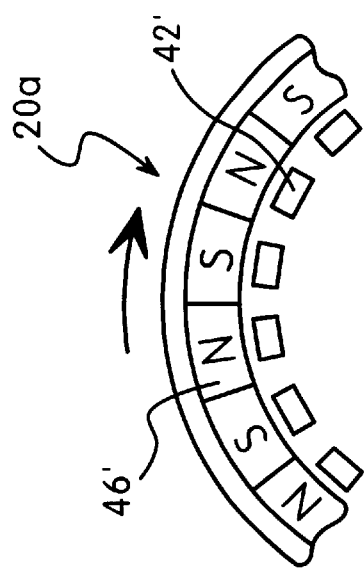
FIG. 7 is a diagrammatic view of the hub dynamo illustrated in FIG. 6 in accordance with the present invention.
Figure 6:
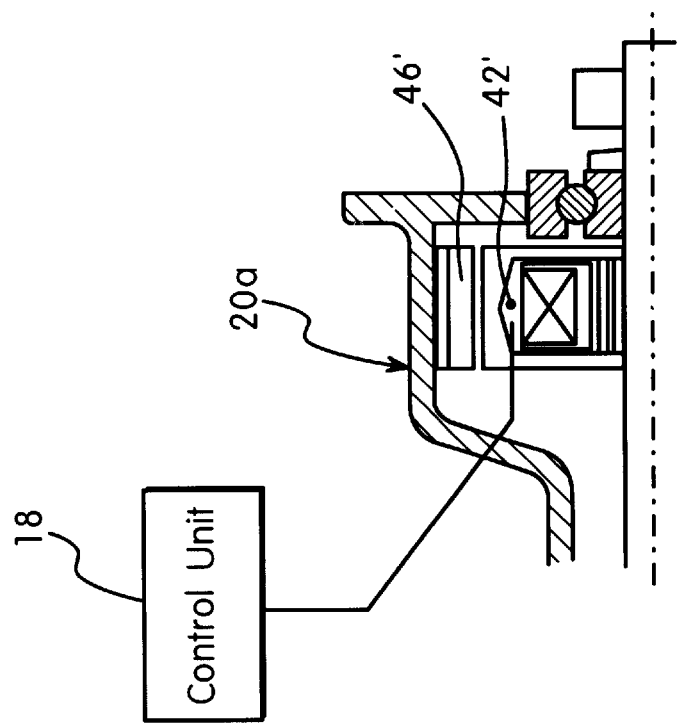
FIG. 6 is a diagrammatic illustration of a hub dynamo for either the front or rear hubs of the bicycle in accordance with the present invention.

As seen in FIGS. 6 and 7, in the case where the front hub 20a has the velocity sensor 42', the front hub 20a is formed as hub dynamo generates AC voltage that is indicative of forward velocity. More specifically, the housing of the front hub 20a has a plurality of circumferentially spaced apart magnets 46' that are located adjacent to the stator yoke 47' of the front hub 20a. Thus, the magnets 46' and the stator yoke 47' of the front hub 20a form the velocity sensor 42', which sends AC voltage as a speed signal. The AC voltage from the velocity sensor 42' indicates the revolutions per unit of time of the front hub 20a by sensing how often the plus pole and minus pole changed per time. Thus, the control unit 18 utilizes AC voltage for calculating forward velocity of bicycle 10.

Figure 8:
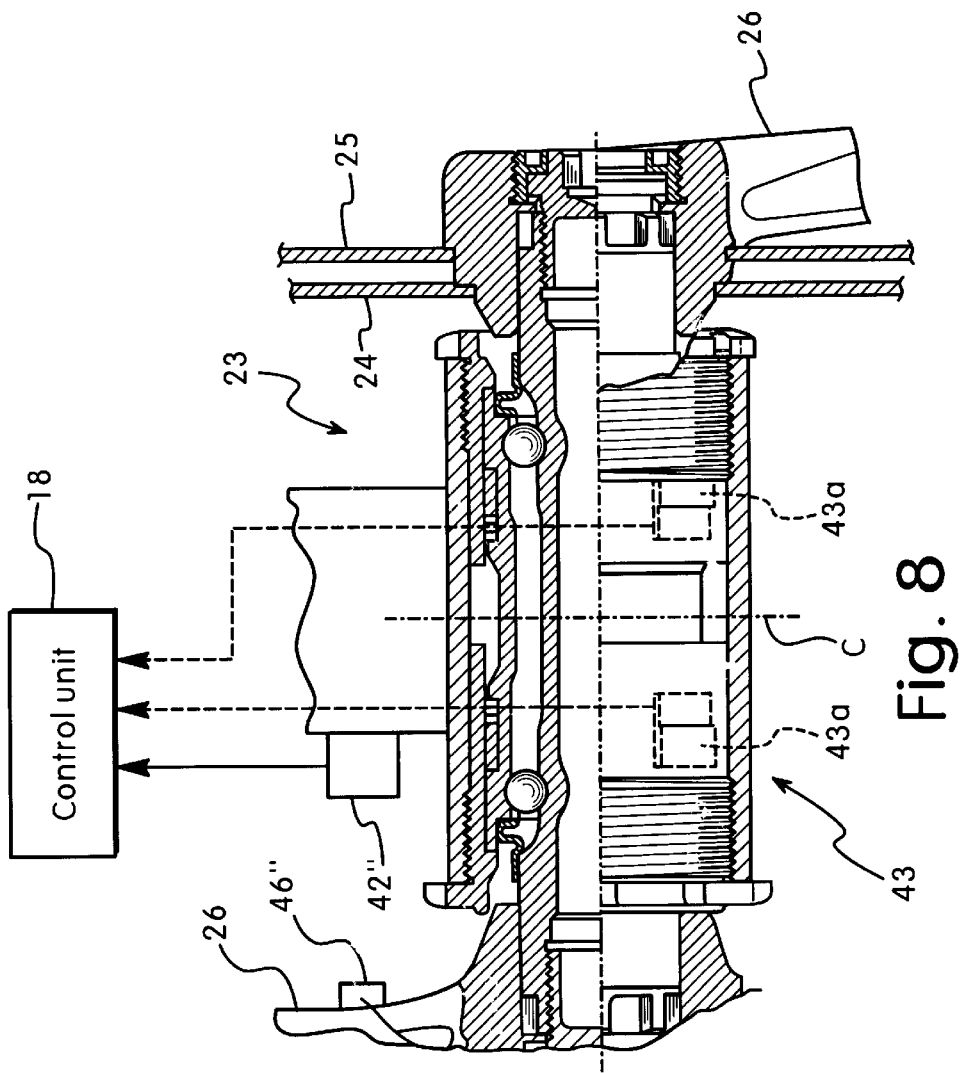
FIG. 8 is a cross-sectional view of the bottom bracket of the bicycle illustrated in FIG. 1 to illustrate pressure sensors utilized to determine the pedaling force.

Alternatively, a crank speed sensor 42" can be used to determined the revolutions per minute of the crank. As seen in FIG. 8, the crank speed sensor 42" is mounted to a portion of main frame 12a and a magnet 46" is mounted to one of the crank arms 26 for measuring revolutions per unit of time of the crank arm 26. If the crank revolution is 0 to 30 rpm, then the rear suspension assembly 16 is soften by the control unit 18. If the crank revolution exceeds 30 rpm, then at least the rear suspension assembly 16 is stiffened by the control unit 18.

Figure 9:
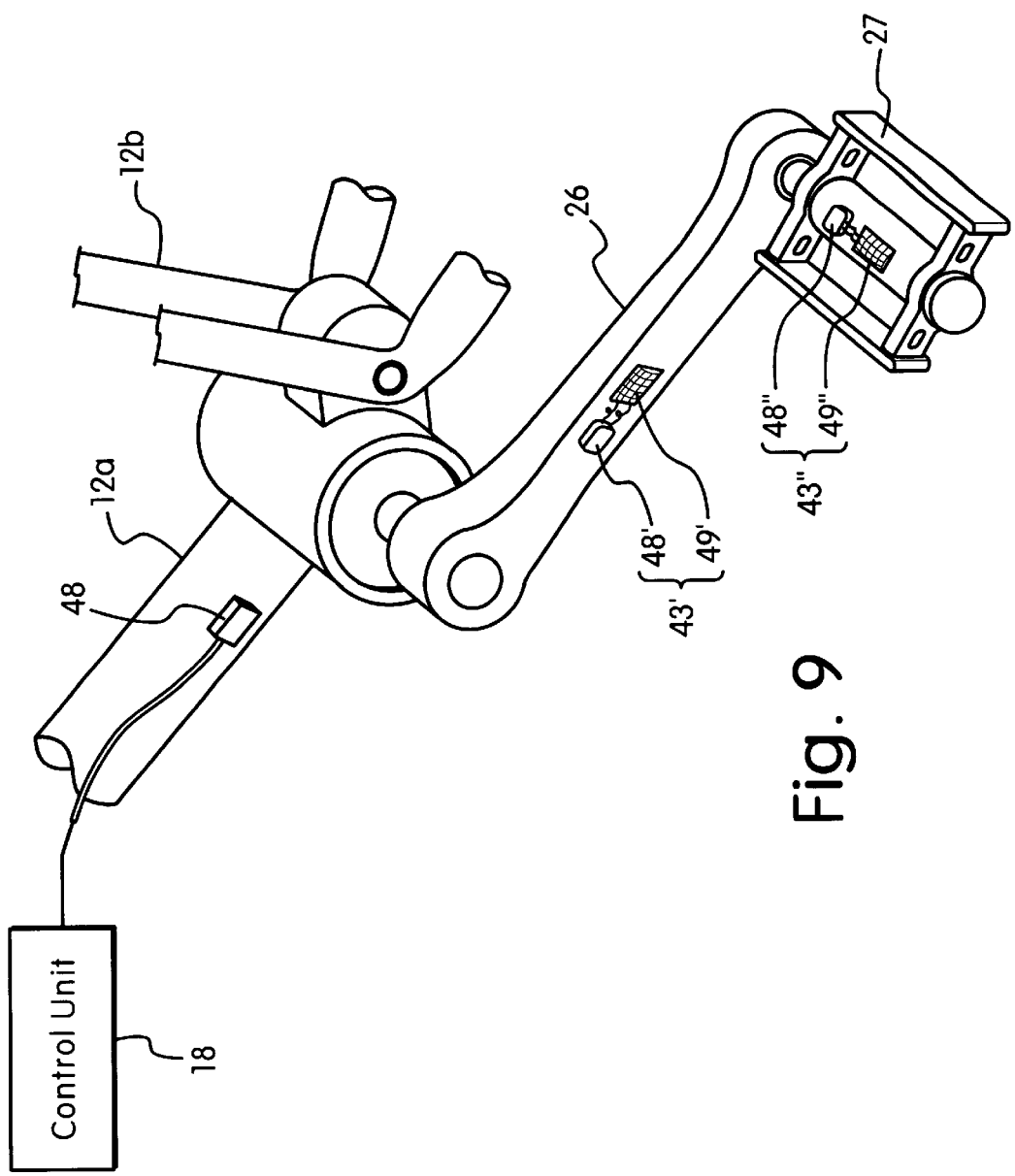
FIG. 9 is a partial perspective view of a portion of the bicycle illustrated in FIG. 1, which illustrates a pedal force sensor and a crank force sensor.
Figure 10:
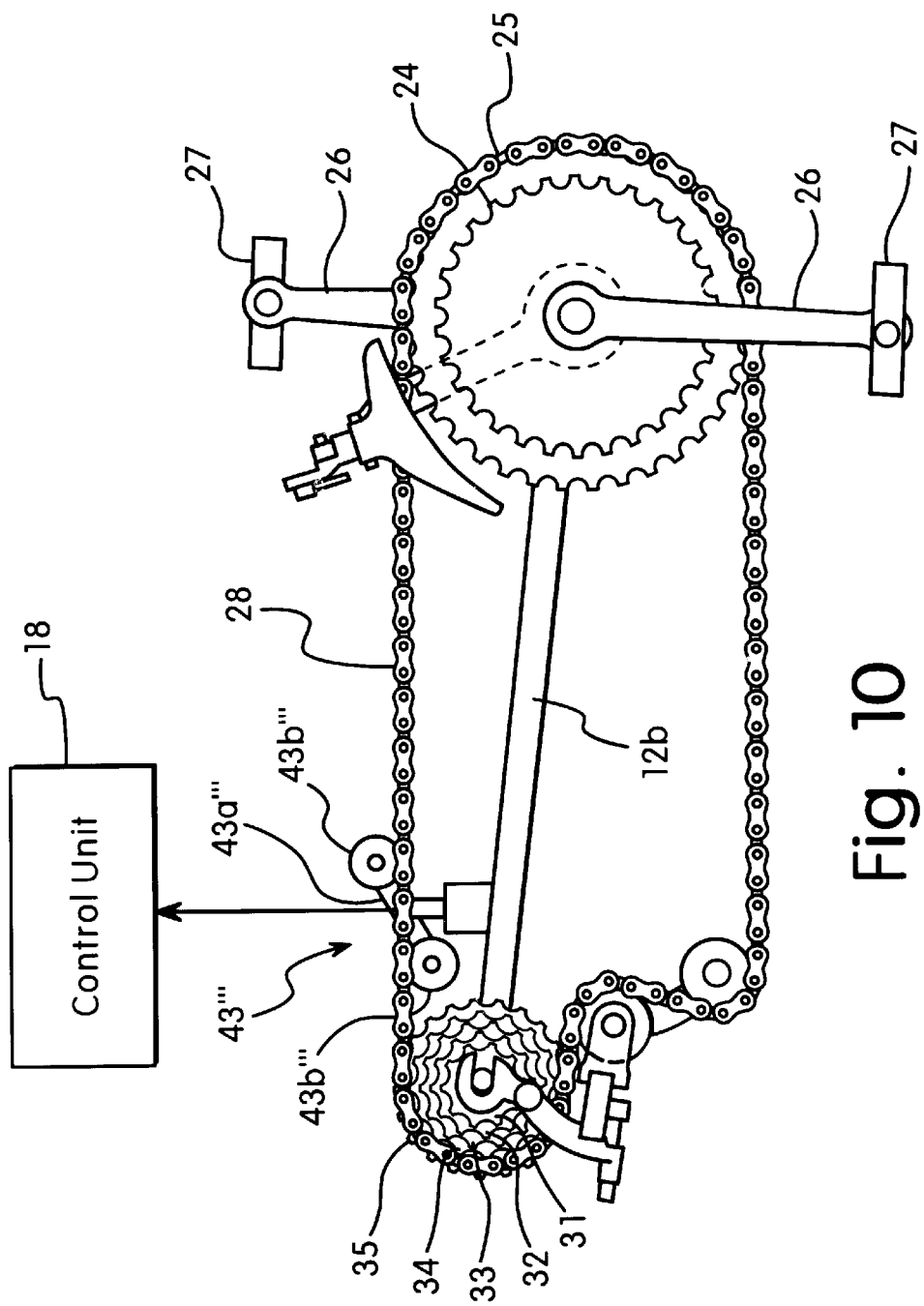
FIG. 10 is a schematic elevational view of the drive train for the bicycle illustrated in FIG. 1, which shows the chain tension sensor.

As seen in FIGS. 8–10, four different types of driving sensors 43, 43', 43" and 43'" are illustrated for providing information on the amount of driving force or torque being transmitted by the rider to the bicycle 10. The bicycle driving sensors 43, 43', 43" and 43'" can all be used together or only one of these sensors could be utilized for controlling the stiffnesses of the front and rear suspension assemblies 14 and 16. In other words, the control unit 18 can be programmed to receive electrical signals from each of the sensors 43, 43', 43" and 43'", and then determine the desired stiffnesses of the front and rear suspension assemblies 14 and 16. It will be apparent to those skilled in the art from this disclosure that the precise programming for the stiffnesses of the front and rear suspension assemblies 14 and 16 will vary depending upon the rider's skill and/or the type of riding.

As seen in FIG. 8, the bicycle driving sensor 43 is preferably a pedaling torque sensor that utilizes a plurality of pressure sensors 43a that are disposed at various circumferential positions within the bottom bracket housing. The precise construction of the bicycle driving sensor 43 is not important to the present invention.

As seen in FIG. 9, the main bicycle frame 12a is provided with a telemeter 48 that is electrically connected to control unit 18 for receiving electrical signals transmitted from telemeters 48' and 48". The telemeter 48' is electrically coupled to a strain gauge 49' that is mounted on the pedal crank arm 26 of the bicycle 10, while the telemeter 48" is electrically connected to a strain gauge 49" that is mounted on the pedal 27. The telemeters 48' and 48" receive electrical data or signals that are indicative of the force and/or torque being applied to the crank arm 26 and the pedal 27, respectively, by the pedaling action of the rider. Telemeters 48' and 48" then send or transfer the data or signals to telemeter 48, which in turn transfers the data or signal to control unit 18. Thus, telemeter 48' and strain gauge 49' form the crank force or torque sensor 43', while the telemeter 48" and strain gauge 49" form the pedaling force sensor 43".

As seen in FIG. 10, the bicycle driving sensor 43'" is a chain tension sensor having a tension sensing arm 43a'" with a pair of tensioning rollers 43b'" at each end. The tension sensing arm 43a'" is coupled to the rear frame 12b for pivotal movement. The tension sensing arm 43a'" is biased by a spring (not shown) such that the rollers 43b'" contact the chain 28 on opposite sides so as to cause the chain 28 to bend partially around each of the rollers 43b'". When the chain tension increases, the chain 28 will urge the rollers 43b'" against the force of the spring on the tension sensing arm 43a'" so as to rotate the tension sensing arm 43a'". This rotation of the tension sensing arm 43a'" causes a pressure switch (not shown) to be engaged indicating the amount of tension being applied to the chain 28. A signal indicative of the amount of chain tension in chain 28 is then sent to the control unit 18 so as to determine the appropriate stiffnesses of the front and/or rear suspension assemblies 14 and 18.

Accordingly, it would be apparent to those skilled in the art from this disclosure bicycle that various other types of sensors may be utilized to determine bicycle driving sensors that can be used to indicate the force and/or torque being inputted into the bicycle 10. For example, the bicycle driving sensors can be any type of sensors that produce a signal based on movement of a bicycle crank, a bicycle pedal, a bicycle bottom bracket or a bicycle chain. The bicycle driving sensors 43, 43' and 43" can be utilized by the control unit 18 to indirectly calculate the chain tension in chain 28, while bicycle driving sensor 43'" produces a more direct calculation of the chain tension in chain 28. When the chain tension exceeds 50 kilograms, the stiffness of the rear suspension 16 is made stiffer by the control unit 18.

Figure 3:
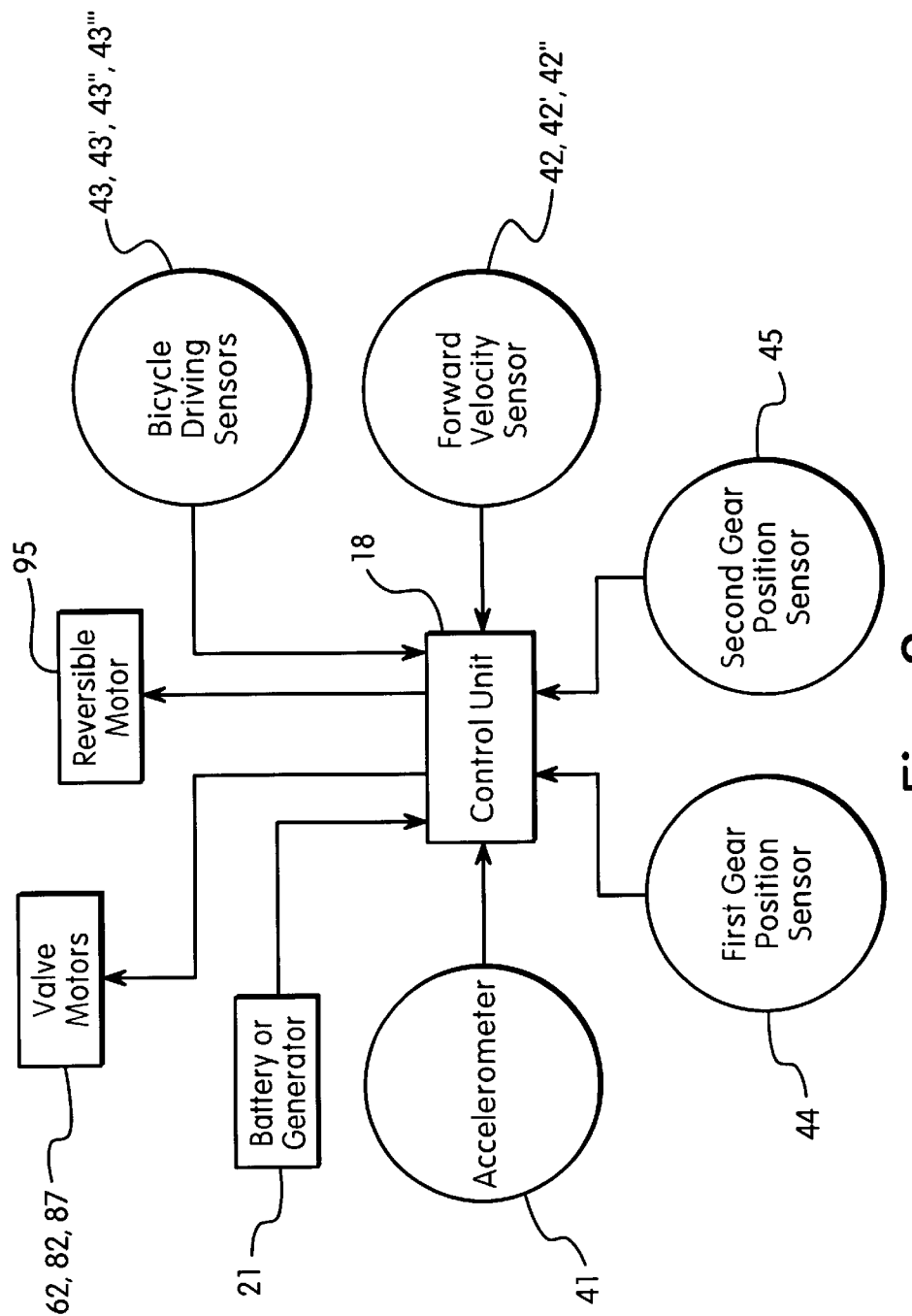
FIG. 3 is a block diagram illustrating a suspension control assembly for controlling the front and rear suspension assemblies.
Figure 11:
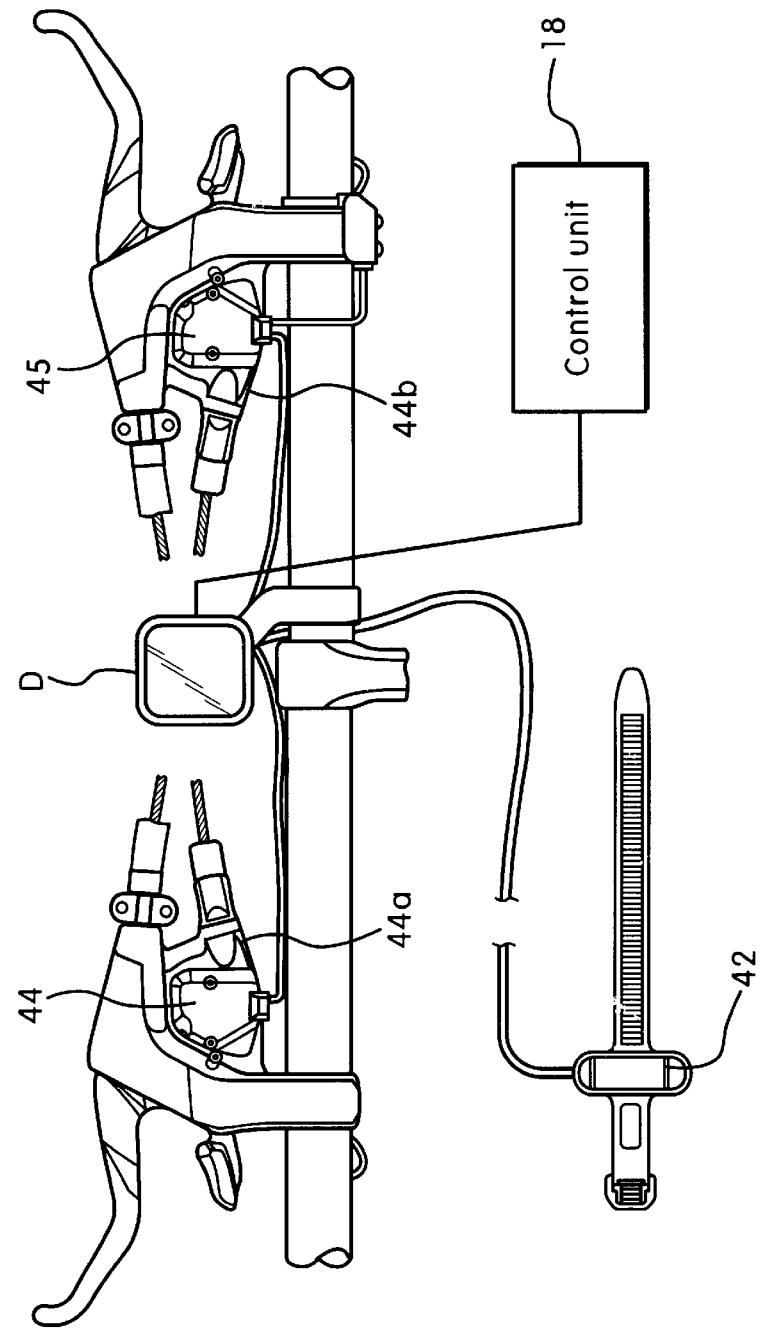
FIG. 11 is a partial top plan view of the bicycle illustrated in FIG. 1 to show the computer display module, the gear position sensors and the magnetic wheel speed or forward velocity sensor.
Figure 12:
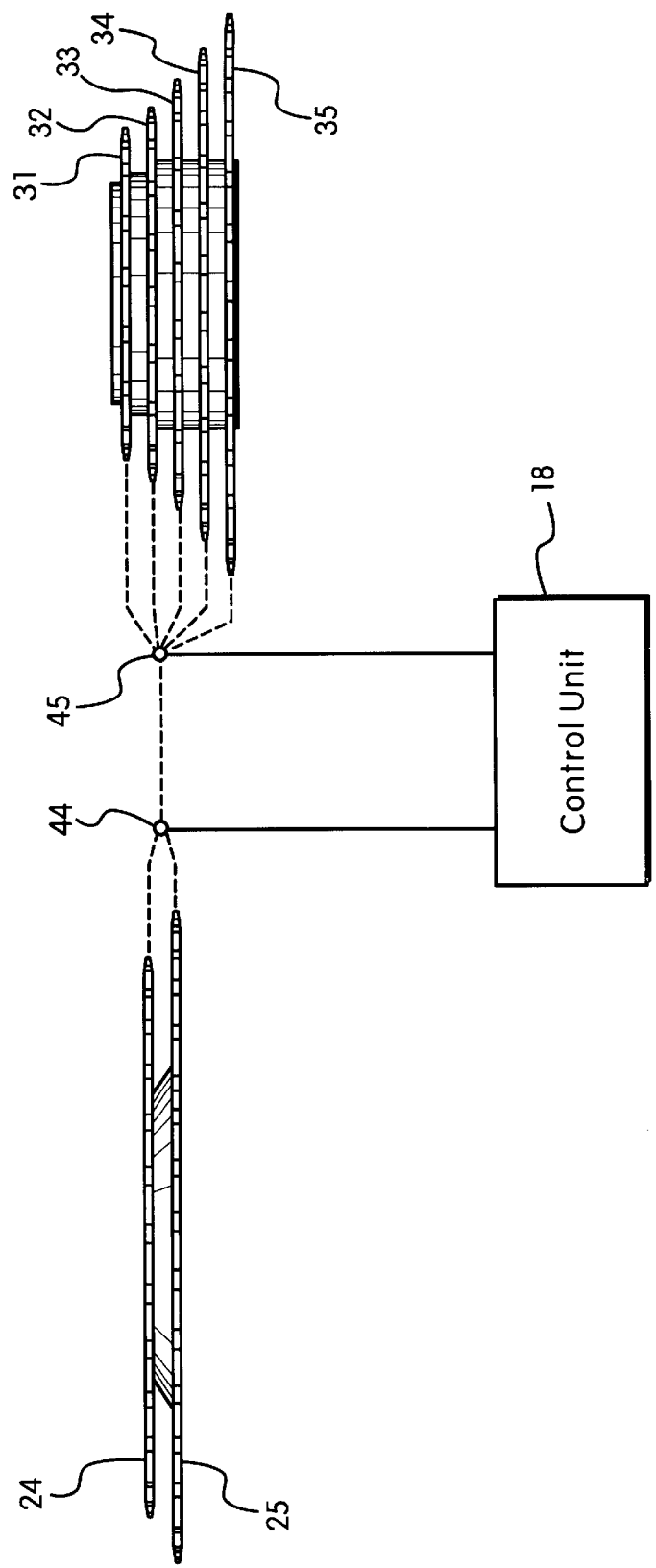
FIG. 12 is a schematic diagram of the drive train for the bicycle of FIG. 1.
Figure 14:
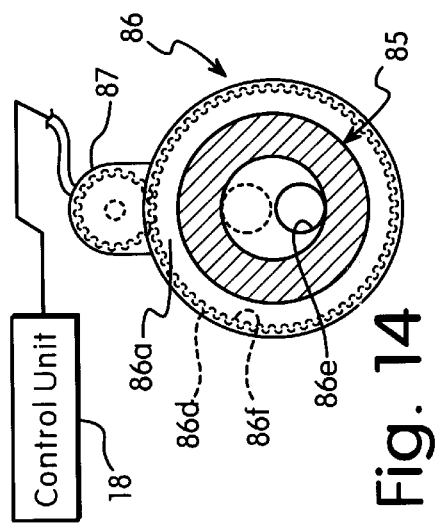
FIG. 14 is an end elevational view of the portion of the fluid conduit illustrated in FIG. 13 with the control valve in the closed position.
Figure 16:
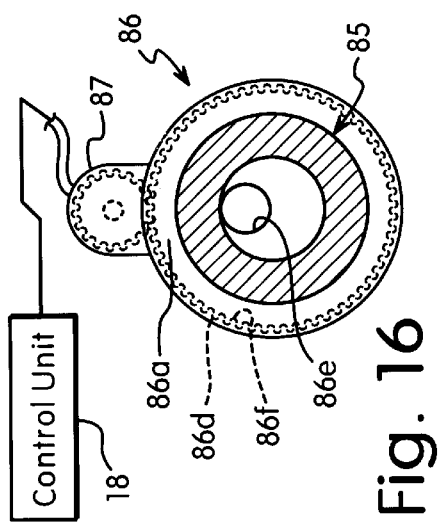
FIG. 16 is an end elevational view of the portion of the fluid conduit illustrated in FIG. 15 with the control valve in the open position.
Figure 13:
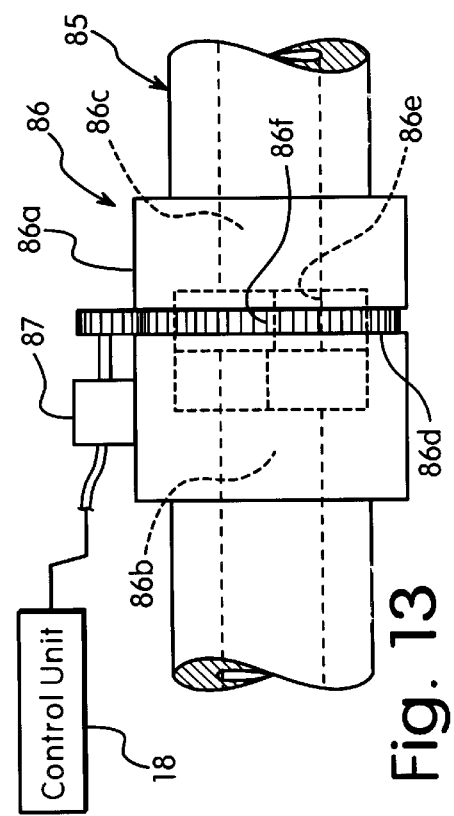
FIG. 13 is a partial elevational view of the fluid conduit connecting the front and rear suspension assemblies with the valve in the closed position.
Figure 15:
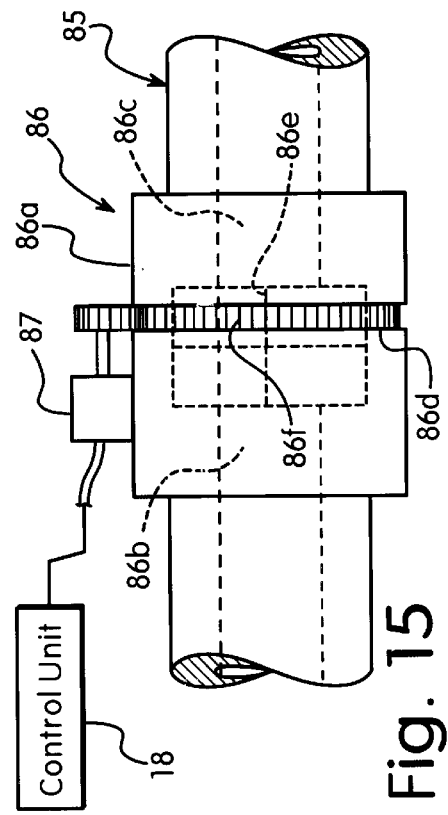
FIG. 15 is a side elevational view of the portion of the fluid conduit illustrated in FIGS. 13 and 14 with the control valve in the open position.

As seen in FIGS. 3, 11 and 12, the front and/or rear suspension assemblies 14 and 16 can also be adjusted based on the current gear selection by the rider. More specifically, the front and rear gear position sensors 44 and 45 indicate the current sprocket that is engaged by the chain 28.

In the preferred embodiment shown in FIG. 11, the front gear position sensors 44 and 45 are mounted on the shifting units 44a and 44b for indicating the gear shift positions based on the shifts of the shifting units 44a and 44b. The precise construction of the gear position sensors 44 and 45 is not important to the present invention. Accordingly, it will be apparent to those skilled in the art from this disclosure that various other types of sensors may be utilized to determine the gear shift positions. A preferred example of the gear position sensors 44 and 45 are illustrated and described in U.S. Pat. No. 6,012,353 which is owned by Shimano Inc.

Preferably, the gear position sensors 44 and 45 are electrically coupled to control unit 18 and the computer display module D, which is also preferably electrically coupled to the control unit 18. When the front gear position sensor 44 indicates that the front sprocket 24 with the smallest number of teeth (front low gear) is engaged by the chain 28, then the control unit 18 will adjust the rear suspension assembly 16 to make it stiffer. Also, when either one of the two largest (the largest number of teeth) rear sprockets 34 and 35 (the two rear low gears) is engaged by the chain 28, the control unit 18 will then make the rear suspension assembly 16 stiffer. In other words, when either one of the two largest rear sprockets 34 and 35 is engaged, the rear gear position sensor 45 sends a signal to the control unit 18 to make the rear suspension assembly 16 stiffer regardless of the position of the chain 28 on the front sprockets 24 and 25. Of course, the control unit 18 can be programmed such that the compression and extension rate of the front suspension 14 will make the front and rear suspensions 14 and 16 stiffer if the terrain is rough regardless of gear positions.

In an alternative embodiment as seen in FIG. 12, front and rear gear position sensors 44' and 45' are mounted adjacent to the front sprockets 24 and 25, and the rear sprockets 31–35 for determining the current gear selection. The precise construction of gear position sensors 44' and 45' are not important to the present invention, and thus, their construction will-not be discussed and/or illustrated in detail herein.

Considering the above-mentioned parameters, the rear suspension assembly 16 will either stiffen or soften accordingly based on the signal inputted into the control unit 18. The timing of the adjustment of the rear suspension assembly 16 takes into account the speed of the bicycle 10 and the distance B between the front and rear tires of the bicycle 10 as well as the amount of compression of the front suspension assembly 14. Thus, the rear suspension assembly 16 responds at the appropriate time with the appropriate resistance.

It will be apparent to those skilled in the art from this disclosure that the control unit 18 can be programmed to independently control the front and rear suspension assemblies 14 and 18 to make them independently stiffer and/or softer in different degrees. In other words, the front and rear suspension assemblies 14 and 16 can both be adjusted, but one or the other of the suspension assemblies can be adjusted to be more stiff or less stiff than the other suspension assembly. Moreover, it will be apparent to those skilled in the art from this disclosure that the control unit 18 can be programmed such that all of the signals from the sensors 41–45 are processed such that all parameters are considered in adjusting the stiffness and/or softness of the suspension assemblies 14 and 16. In other words, certain parameters may override other parameters in determining the softness and/or stiffness of the suspension assemblies 14 and 16. In addition, the control unit 18 can be preset at the bicycle manufacturer with certain preset selections based on the rider's skill and/or riding conditions. Alternatively, the control unit 18 can be set up such that the rider can adjust each of the parameters individually as needed and/or desired to meet the rider's skill and/or the riding conditions. Of course, once the control unit 18 has been programmed, the control unit 18 will automatically adjust the front and/or rear suspension assemblies 14 and 16 based on one or more of the above-mentioned parameters from one or more of the sensors 41–45.

The particular construction of the front and rear suspension assemblies 14 and 16 is not critical to the present invention. There are currently numerous types of adjustable suspensions for bicycle 10 that can be utilized to carry out the present invention. Preferably, the suspension assemblies 14 and 16 are conventional air shocks with a hydraulic dampening mechanism that have been modified to carry out the present invention.

For the sake of simplicity, only one of the cylinders or shocks 50 from the front suspension assembly 14 will be discussed and illustrated herein. It will be apparent to those skilled in the art from this disclosure that a pair of cylinders or shocks 50 are utilized to form the front suspension assembly 14, while a single cylinder or shock 70 can be utilized to form the rear suspension assembly 16. The constructions of the cylinders or shocks 50 for the front suspension assembly 14 are substantially identical to the cylinder or shock 70 for the rear suspension assembly 16, except for their sizes and shapes.

Figure 4:
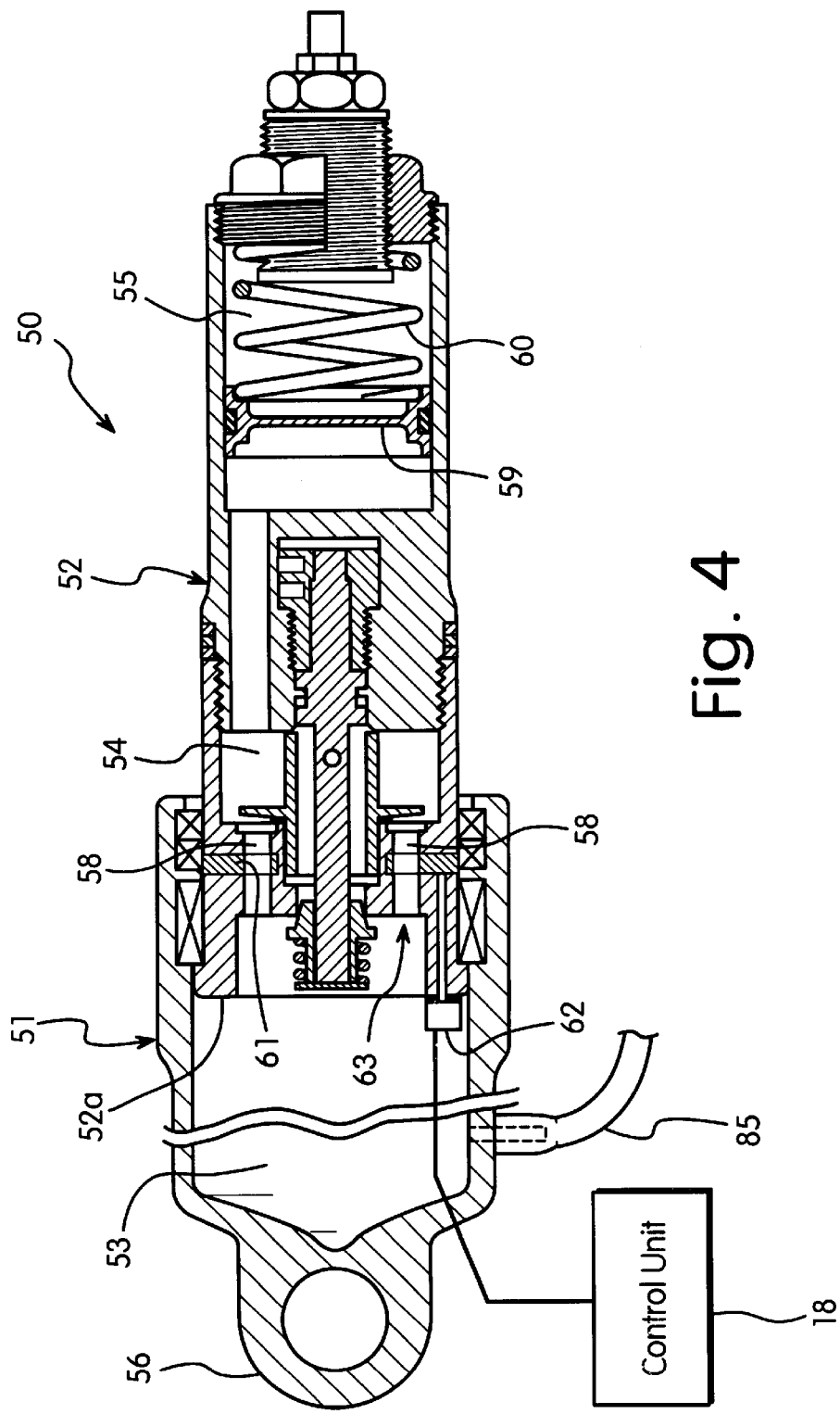
FIG. 4 is a cross-sectional view of one of the front cylinders for the front suspension assembly in accordance with the present invention.

As seen in FIGS. 1, 2 and 4, each cylinder 50 basically includes outer and inner tubular telescoping members 51 and 52 defining inner cavities 53, 54 and 55 in the cylinder 50. The outer tubular member 51 is coupled to the front hub 20*a* by a mounting member 56, while the inner tubular member 52 is coupled to the main frame 12*a* by a mounting member 57. The outer tubular member 51 has the lower hydraulic cavity that receives the bottom end 52*a* of the inner tubular member 52. The bottom end 52*a* of the inner tubular member 52*a* forms a piston that has a plurality of orifices 58. The orifices 58 fluidly couple the inner hydraulic cavities 53 and 54 together such that hydraulic fluid flows from the lower hydraulic cavity 53 to an upper hydraulic cavity 53 formed by a portion of the inner tubular member 52. The inner tubular member 52 also has the air cavity or chamber 55 formed above the upper hydraulic cavity 54.

The air chamber 55 and upper hydraulic cavity 54 are separated by an axially slidable piston 59. Within the air chamber 55 is a coil spring 60. The stiffness of the cylinder 50 is controlled by changing the size of the orifices 58 utilizing a control disk 61 that is rotatably mounted to change the size of the orifices 58. In other words, the control disk 61 is moveable to change the amount of overlapping or closing of the orifices 58. Preferably, the control disk 61 of the cylinder 50 is controlled by a electric motor 62 that rotates the control disk 61. The electric motor 62 is electrically coupled to the control unit 18 that selectively operates the electrical motor 62 to adjust the stiffness of the cylinder 50. Thus, the orifices 58 and the control disk 61 form a front cylinder control valve 63 that is automatically adjusted via the control unit 18. The electric motors 62 and the front cylinder control valves 63 of the cylinders 50 form a front controller or adjustment mechanism that changes or adjusts the stiffness or softness of the front suspension assembly 14 based on the control unit 18. Of course, it will be apparent to those skilled in the art from this disclosure that other types of adjustment mechanisms can be utilized for controlling the stiffness of the cylinder 50.

Figure 5:
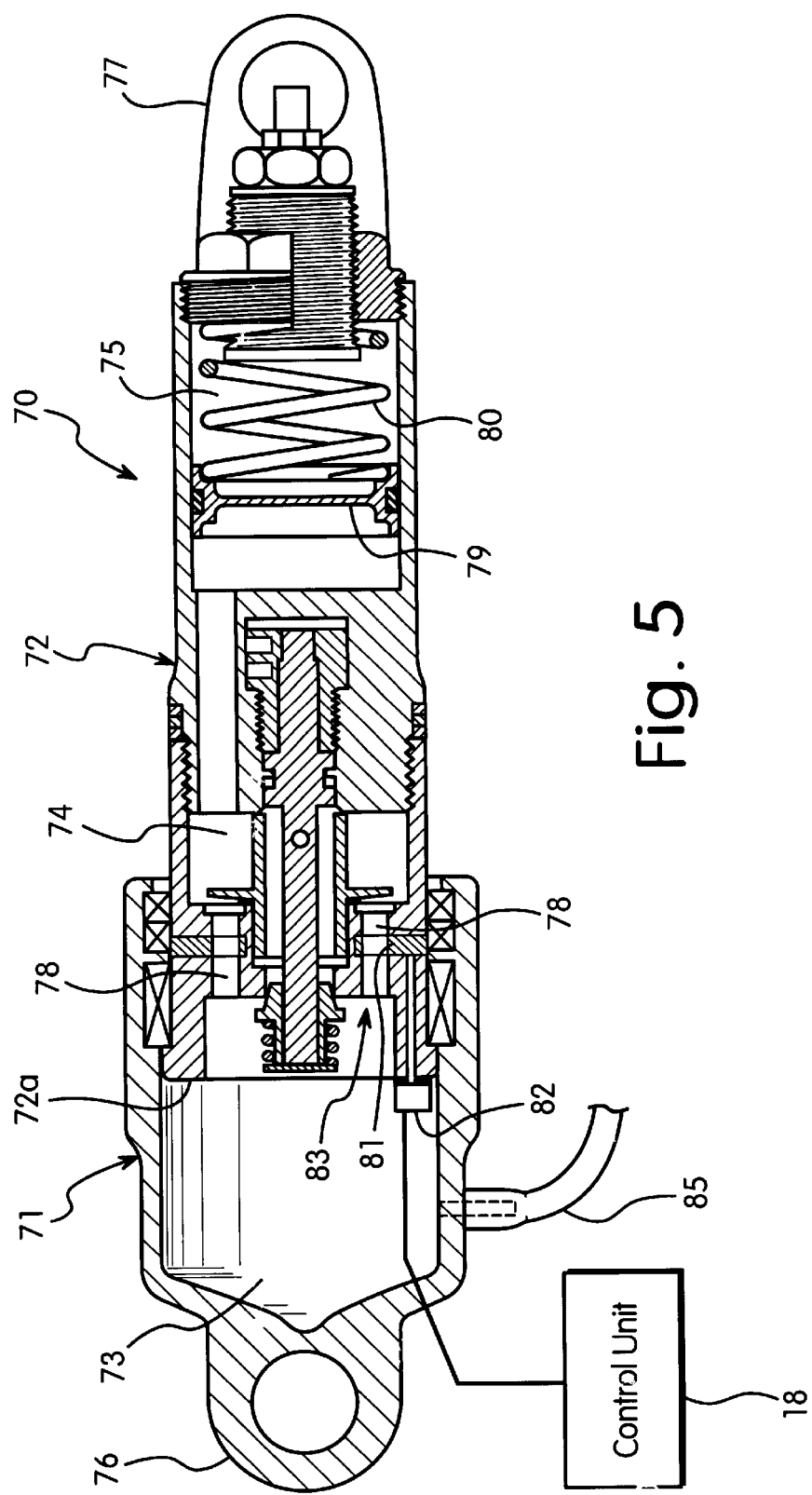
FIG. 5 is a cross-sectional view of a rear cylinder for the rear suspension assembly in accordance with the present invention.

As seen in FIGS. 1, 2 and 5, the cylinder 70 basically includes outer and inner tubular telescoping members 71 and 72 defining inner cavities 73, 74 and 75 in the cylinder 70. The outer tubular member 71 is coupled to the main frame portion 12*a* by a mounting member 76, while the inner tubular member 72 is coupled by a mounting member 77 to the rear frame 12*b* that is movably coupled to the main frame 12*a*. The outer tubular member 71 has the lower hydraulic cavity that receives the bottom end 72*a* of the inner tubular member 72. The bottom end 72*a* of the inner tubular member 72*a* forms a piston that has a plurality of orifices 78. The orifices 78 fluidly couple the inner hydraulic cavities 73 and 74 together such that hydraulic fluid flows from the lower hydraulic cavity 73 to an upper hydraulic cavity 73 formed by a portion of the inner tubular member 72. The inner tubular member 72 also has the air cavity or chamber 75 formed above the upper hydraulic cavity 74.

The air chamber 75 and upper hydraulic cavity 74 are separated by an axially slidable piston 79. Within the air chamber 75 is a coil spring 80. The stiffness of the cylinder 70 is controlled by changing the size of the orifices 78 utilizing a control disk 81 that is rotatably mounted to change the size of the orifices 78. In other words, the control disk 81 is moveable to change the amount of overlapping or closing of the orifices 78. Preferably, the control disk 81 of the cylinder 70 is controlled by a electric motor 82 that rotates the control disk 81. The electric motor 82 is electrically coupled to the control unit 18 that selectively operates the electrical motor 62 to adjust the stiffness of the cylinder 70. Thus, the orifices 78 and the control disk 81 form a rear cylinder control valve 83 that is automatically adjusted via the control unit 18. The electric motor 82 and the rear cylinder control valve 83 of the cylinder 70 form a rear controller or adjustment mechanism that changes or adjusts the stiffness or softness of the rear suspension assembly 16 based on the control unit 18. Of course, it will be apparent to those skilled in the art from this disclosure that other types of adjustment mechanisms can be utilized for controlling the stiffness of the cylinder 70.

Preferably, the lower hydraulic cavities 53 of the front cylinders 50 are fluidly connected to the corresponding hydraulic cavity 73 of the rear cylinder 70. The fluid conduit 85 connecting the front and rear hydraulic cavities 53 and 73 includes an ON/OFF valve 86 for disconnecting the flow of fluid the front and rear hydraulic cavities 53 and 73. The control unit 18 is operatively coupled to valve 86, which acts to manually fix the ride height by fixing the front and rear suspension assemblies 14 and 16. Thus, the rear suspension assembly 16 can be locked in a compressed state.

The oil or hydraulic fluid is a relatively incompressible fluid and the pistons are configured such that the oil and air provide a dampening function. Of course, this air and oil height/suspension locking mechanism can be used with traditional front and rear suspensions as needed and/or desired.

The hydraulic fluid flowing between the first and second suspension assemblies 14 and 16 acts as a mechanical actuating mechanism between the front and rear suspension assemblies 14 and 16. The valve 86 is attached to the conduit 85 for controlling the flow of hydraulic fluid between the front and rear suspension assemblies 14 and 16. Bottom portions of the front and rear suspension assemblies 14 and 16 are filled with oil or some other working fluid as discussed above and are coupled to the conduit 85. Upper portions of the front and rear suspension assemblies 14 and 16 are filled with air. The conduit 85 is also filled with hydraulic fluid. Therefore, the front and rear suspensions along with the conduit 85 preferably form a closed system. When an operator (not shown) initially mounts the bicycle the suspension system, the front and rear suspension assemblies 14 and 16 adjusts to his or her weight. When the valves 63, 83 and 86 are closed, hydraulic fluid in the conduit 85 cannot move between the front and rear suspension assemblies 14 and 16. Moreover, when the valves 63, 83 and 86 are closed, hydraulic fluid in the cylinders 50 and 70 will not move between the lower hydraulic cavities 53 and 73 and the upper hydraulic cavities 54 and 74. Therefore, the height of the bicycle 10 is substantially maintained whether the operator mounts or dismounts. In other words, the rear suspension assembly 16 is maintained in the compressed state and hydraulic fluid will not flow to the front suspension assembly 14. The valve 86 is preferably automatically activated by the control unit 18 as explained below.

As seen in FIGS. 13–16, the valve 86 is preferably automatically operated by an electric motor 87 that is controlled by the control unit 18. The valve 86 includes a housing 86a with a first opening 86b, a second opening 86c and a control disk 86d movably mounted in the housing 86a between the first and second openings 86b and 86c. The control disk 86d has an orifice 86e and a plurality of teeth 86f on the outer periphery to form a gear for moving the control disk 86d to either align or offset the orifice 86e with the first and second openings 86b and 86c. Specifically, the gear 87a of motor 87 engages teeth 86f to rotate the control disk 86d between an open position and a closed position. In other words, the control disk 86d is rotatably mounted to the housing 86a about an axis of rotation, with the orifice 86e radially spaced from the axis of rotation. This arrangement locks the rear suspension assembly 16 in a compressed condition for easy mounting and dismounting.

Preferably, the control unit 18 receives a signal from the forward velocity sensor 42 or 42' or 42" to determine when the bicycle 10 has come to a complete stop. Once the control unit 18 determine that the bicycle 10 is completely stopped, the control unit 18 automatically closes the valves 63, 83 and 86 to lock the front and rear suspension assemblies 14 and 16. Preferably, the control unit 18 waits a few seconds after the bicycle 10 has completely stopped before closing the valves 63, 83 and 86. In other words, when the rider is sitting on the stopped bicycle 10, the rear suspension assembly 16 is compressed under the weight of the rider. Thus, the hydraulic fluid from the rear cylinder 70 flows to the front cylinders 50. The control unit 18 locks front and rear suspension assemblies 14 and 16 so that the seat of the bicycle 10 is lower for easy mounting and dismounting of the bicycle 10.

Figure 17:
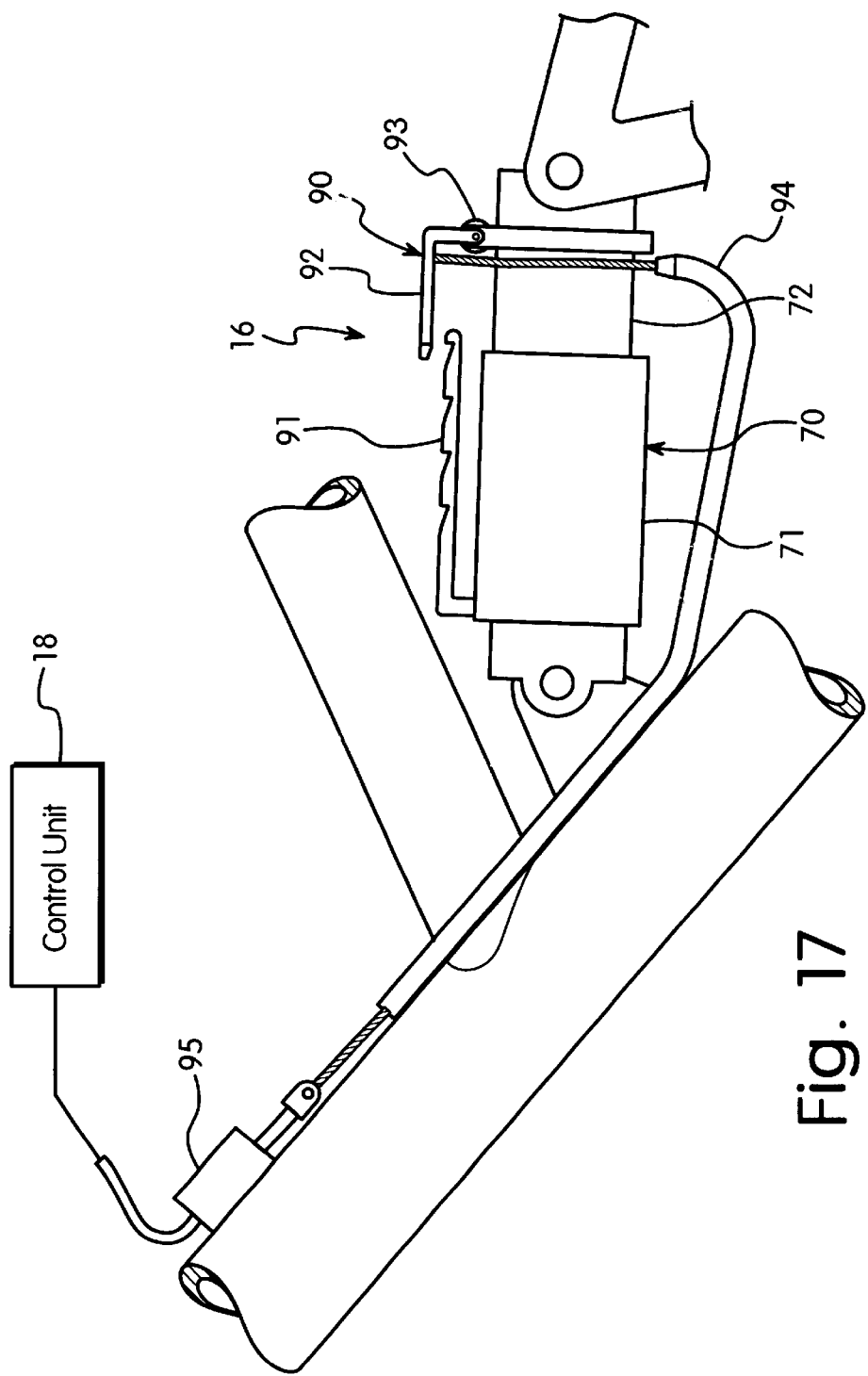
FIG. 17 is a partial elevational view of the bicycle illustrated in FIG. 1 with a mechanical lock being coupled thereto in accordance with another aspect of the present invention.

Referring to FIG. 17, an alternative method is illustrated for locking the rear suspension assembly 16 in a compressed condition to be easily mounted and dismounted. In particular, a mechanical linkage assembly 90 is utilized instead of controlling the valves 63, 83 and 86. The mechanical linkage assembly 90 should be capable of locking the inner and outer tubular members 71 and 72 in a compressed condition. Preferably, the mechanical linkage assembly 90 is adjustable in length to accommodate different amounts of compression. The rear suspension assembly 16 has a fixed ratchet portion 91 attached to outer tubular member 71 and a movably hook portion 92 that is normally biased away from the ratchet portion 91 by a torsion spring 93. A motor-operated cable 94 is attached to the hook portion 92 to move the hook portion 92 into engagement with the ratchet portion 91.

Preferably, a reversible motor 95 operate the motor-operated cable 94 to move the hook portion 92 between a locked position and an unlocked position. In the locked position, the hook portion 92 engages teeth of the ratchet portion 91, while in unlocked position, the hook portion 92 is spaced from the teeth of the ratchet portion 91. The control unit 18 automatically operates the reversible motor 95. Once the control unit 18 determine that the bicycle 10 is completely stopped, the control unit 18 automatically energizes the reversible motor 95 to move the hook portion 92 to the locked position. Preferably, the control unit 18 waits a few seconds after the bicycle 10 has completely stopped before locking the rear cylinder 70. In other words, when the rider is sitting on the stopped bicycle 10, the rear suspension assembly 16 is compressed under the weight of the rider. Thus, the rear suspension assembly 16 compensates for the rider's weight. The control unit 18 then locks the rear suspension assembly 16 so that the seat of the bicycle 10 is lower for easy mounting and dismounting of the bicycle 10.

Figure 20:
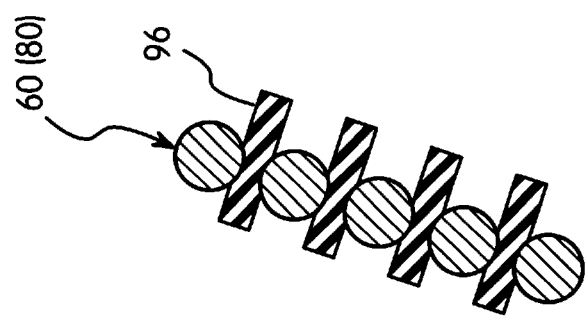
FIG. 20 is a partial cross-sectional view of the coil spring and compressible member illustrated in FIGS. 18 and 19 as viewed along section line 19—19 of FIG. 18 after being compressed.
Figure 19:
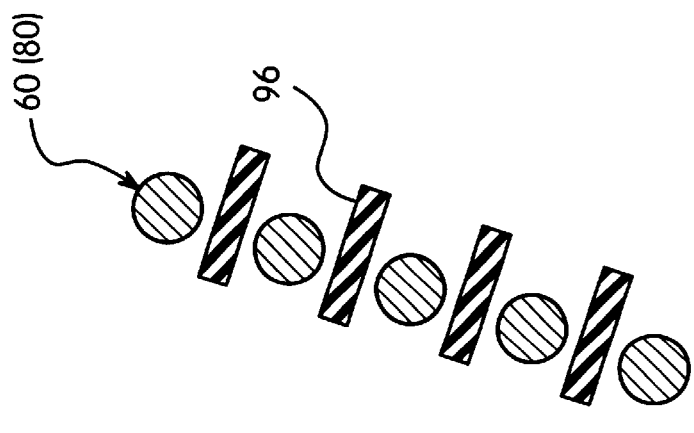
FIG. 19 is a partial cross-sectional view of a coil spring and compressible member illustrated in FIG. 18 as viewed along section line 19—19 of FIG. 18.
Figure 18:
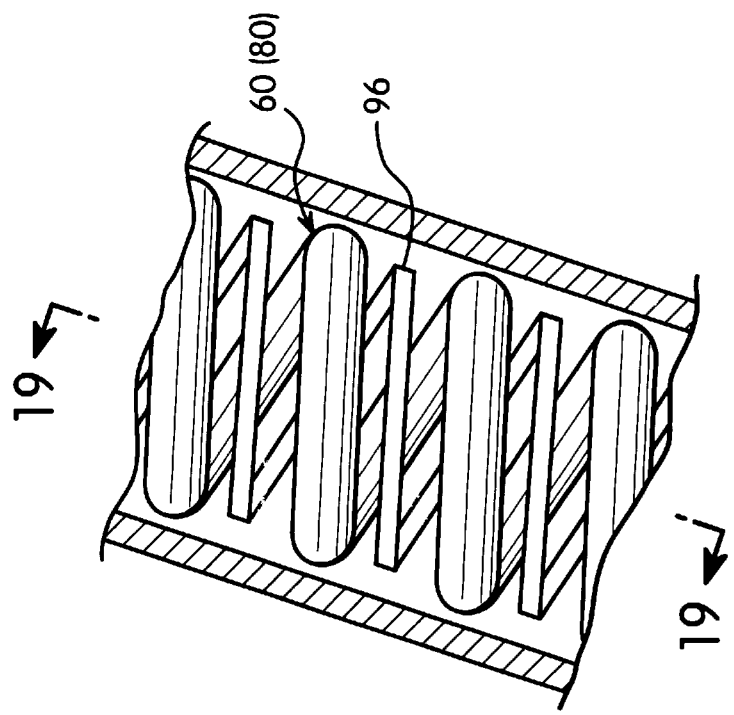
FIG. 18 is a partial cross-sectional view of the inner tubular member with a coil-shaped compressible member or material located between the turns of the coil spring for use with the front and rear suspension assemblies illustrated in FIGS. 1 and 2 in accordance with another aspect of the present invention.

Referring now to FIGS. 18–20, the coil spring 60 or 80, preferably has a compressible material 96 located between individual turns of the coil spring 60 or 80. Specifically, FIGS. 18 and 19 show an uncompressed state of the coil spring 60 or 80, while and FIG. 20 shows a compressed state of the coil spring 60 or 80. In this embodiment, the compressible material 96 is a coil or spiral shaped elastomeric member constructed of a resilient elastomer. The compressible material 96 prevents the coil spring 60 or 80 from being fully compressed. Therefore, the coil spring 60 or 80 in has an increased spring constant. Of course, compressible material 96 can have different configurations as needed and/or desired.

For example as seen in FIGS. 21–23, the coil spring 60 or 80, preferably has a compressible material 96' located between individual turns of the coil spring 60 or 80. Specifically, FIGS. 21 and 22 show an uncompressed state of the coil spring 60 or 80, while and FIG. 23 shows a compressed state of the coil spring 60 or 80. In this embodiment, the compressible material 96' is an elastomeric member that has a connecting portion 97' and a plurality of compressing portions 98' located between individual turns of the coil spring 60 or 80. The compressing portions 98' are individual fingers that are longitudinally spaced along the connecting portion 97'. As in the prior embodiment, the compressible material 96' prevents the coil spring 60 or 80 from being fully compressed. Therefore, the coil spring 60 or 80 in this embodiment also has an increased spring constant.

Figure 25:
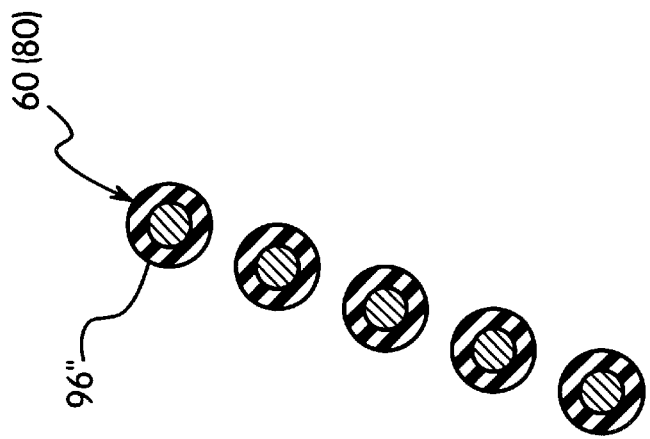
FIG. 25 is a partial cross-sectional view of the coated coil spring illustrated in FIG. 24 as viewed along section line 25—25 of FIG. 24 before compression.
Figure 24:
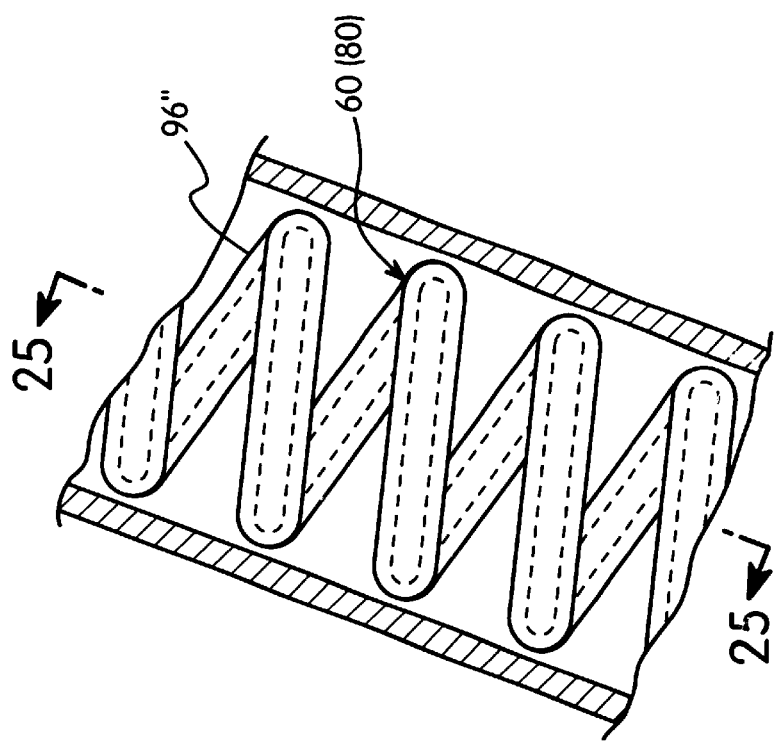
FIG. 24 is a partial cross-sectional view of the inner tubular member having an alternate embodiment of a coil spring with an elastomeric coating of compressible material on the turns of the coil spring for use with the front and rear suspension assemblies illustrated in FIGS. 1 and 2.

Referring now to FIGS. 24 and 25, the coil spring, preferably has a compressible material 96" located between individual turns of the coil spring 60 or 80. Specifically, in this embodiment, the compressible material 96" is compressible material is an elastomeric coating that is applied to at least surfaces of the coil spring 60 or 80 that face one of the individual turns of the coil spring 60 or 80. Preferably, the entire coil spring 60 or 80 is completely coated. As in the prior embodiments, the compressible material 96" prevents the coil spring 60 or 80 from being fully compressed. Therefore, the coil spring 60 or 80 in this embodiment also has an increased spring constant.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle suspension system comprising:
   a control unit;
   a suspension configured to be coupled between first and second parts of a bicycle that are movable relative to each other in response to a shock applied to the bicycle, said suspension being selectively adjustable by said control unit to change stiffness of said suspension;
   a bicycle driving sensor operatively coupled to said control unit to input a first signal that is indicative of bicycle driving force;
   a velocity sensor operatively coupled to said control unit to input a second signal that is indicative of forward velocity;
   a wheel terrain sensor operatively coupled to said control unit to input a terrain signal that is indicative of an amount of compression or expansion of said suspension based on at least one of a plurality of conditions including forward velocity, tilt, horizontal acceleration and vertical acceleration of the bicycle; and
   a controller operatively connected to said suspension and said control unit so that said control unit selectively adjusts stiffness of said suspension in response to at least said bicycle driving force.

2. A bicycle suspension system according to claim 1, wherein
   said wheel terrain sensor produces said terrain signal such that said control unit calculates vertical and horizontal accelerations.

3. A bicycle suspension system according to claim 2, wherein
   said front wheel terrain sensor includes an accelerometer.

4. A bicycle suspension system according to claim 2, wherein
   said stiffness of said suspension is made softer by said control unit when said vertical acceleration exceeds approximately 0.5 G.

5. A bicycle suspension system according to claim 2, wherein
   said stiffness of said suspension is made stiffer by said control unit when said horizontal acceleration exceeds approximately 1.0 G.

6. A bicycle suspension system according to claim 1, wherein
   said wheel terrain sensor produces said terrain signal such that said control unit calculates tilt and said stiffness of said suspension is made stiffer by said control unit when said control unit calculates a forward inclination of a predetermined value from horizontal.

7. A bicycle suspension system according to claim 6, wherein
   said stiffness of said suspension is made stiffer when said predetermined value of said forward inclination calculated by said control unit is at least approximately five percent.

8. A bicycle suspension system comprising:
   a control unit;
   a suspension configured to be coupled between first and second parts of a bicycle that are movable relative to each other in response to a shock applied to the bicycle, said suspension being selectively adjustable by said control unit to change stiffness of said suspension;
   a bicycle driving sensor operatively coupled to said control unit to input a first signal that is indicative of bicycle driving force;
   a velocity sensor operatively coupled to said control unit to input a second signal that is indicative of forward velocity;
   a first gear position sensor operatively coupled to said control unit to input a first gear position signal that is indicative of gear position, and
   a controller operatively connected to said suspension and said control unit so that said control unit selectively adjusts stiffness of said suspension in response to at least one of said bicycle driving force and said gear position.

9. A bicycle suspension system according to claim 8, wherein said stiffness of said suspension is made stiffer by said control unit when said first gear position signal of said first gear position sensor indicates that a front sprocket with lowest number of teeth is engaged by a chain.

10. A bicycle suspension system according to claim 9, further comprising a second gear position sensor operatively coupled to said control unit to input a second gear position signal that is indicative of gear position.

11. A bicycle suspension system according to claim 10, wherein said stiffness of said suspension is made stiffer by said control unit when said second gear position signal of said second gear position sensor indicates that one of two rear sprockets with largest number of teeth is engaged by a chain.

12. A bicycle suspension system according to claim 8, wherein said stiffness of said suspension is made stiffer by said control unit when said first gear position signal of said first gear position sensor indicates that one of two rear sprockets with largest number of teeth is engaged by a chain.

13. A bicycle suspension system according to claim 8, wherein said stiffness of said suspension is made stiffer by said control unit when said first gear position signal of said first gear position sensor indicates that a front sprocket with largest number of teeth is engaged by a chain, and a second gear position sensor indicates that rear sprocket with second largest number of teeth is engaged by the chain.

14. A bicycle suspension system according to claim 8, wherein said suspension is a rear suspension assembly.

15. A bicycle suspension system according to claim 8, wherein said suspension is a front suspension assembly.

16. A bicycle suspension system according to claim 15, further comprising a rear suspension assembly configured to be coupled between third and fourth parts of the bicycle, said rear suspension assembly being selectively adjustable by said control unit to change stiffness of said rear suspension assembly via a rear controller.

17. A bicycle suspension system comprising:

a control unit;

a suspension configured to be coupled between first and second parts of a bicycle that are movable relative to each other in response to a shock applied to the bicycle, said suspension being selectively adjustable by said control unit to change stiffness of said suspension;

a bicycle sensor operatively coupled to said control unit to input a first signal that is indicative of at least bicycle driving force;

a controller operatively connected to said suspension and said control unit so that said control unit selectively adjusts stiffness of said suspension in response to said bicycle driving force; and a first gear position sensor operatively coupled to said control unit to input a first gear position signal that is indicative of gear position, and said control unit being operatively coupled to said controller so that said control unit selectively adjusts stiffness of said suspension in response to said gear position.

* * * * *